United States Patent
Saha et al.

(10) Patent No.: US 12,039,419 B2
(45) Date of Patent: Jul. 16, 2024

(54) AUTOMATICALLY LABELING FUNCTIONAL BLOCKS IN PIPELINES OF EXISTING MACHINE LEARNING PROJECTS IN A CORPUS ADAPTABLE FOR USE IN NEW MACHINE LEARNING PROJECTS

(71) Applicant: FUJITSU LIMITED, Kawasaki (JP)

(72) Inventors: Ripon K. Saha, Santa Clara, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 939 days.

(21) Appl. No.: 17/010,669

(22) Filed: Sep. 2, 2020

(65) Prior Publication Data

US 2022/0067576 A1 Mar. 3, 2022

(51) Int. Cl.
*G06N 20/00* (2019.01)
*G06F 16/2457* (2019.01)

(52) U.S. Cl.
CPC ....... *G06N 20/00* (2019.01); *G06F 16/24573* (2019.01)

(58) Field of Classification Search
CPC ..... G06N 20/00; G06N 3/10; G06F 16/24573
See application file for complete search history.

(56) References Cited

U.S. PATENT DOCUMENTS

| 10,521,224 | B2 | 12/2019 | Saha et al. | |
| 2010/0257505 | A1* | 10/2010 | Hinchey | G06F 8/10 717/106 |
| 2020/0257717 | A1* | 8/2020 | Li | G06F 40/211 |
| 2021/0081377 | A1* | 3/2021 | Polleri | H04L 9/0894 |
| 2021/0097444 | A1* | 4/2021 | Bansal | G06N 20/20 |
| 2022/0004914 | A1* | 1/2022 | Kirchner | G06F 8/35 |

OTHER PUBLICATIONS

Zhong, "Practical Block-wise Neural Network Architecture Generation", 2018. (Year: 2018).*
Zhong, "BlockQNN: Efficient Block-Wise Neural Network Architecture Generation", IEEE Transactions on Pattern Analysis and Machine Intelligence. Date of publication Jan. 23, 2020. (Year: 2020).*
European Office Action dated Mar. 21, 2023 as received in application No. 21191890.9.
J. Cambronero, M. Rinard (2019). AL: Autogenerating Supervised Learning Programs. Splash OOPSLA Oct. 10, 2019.

(Continued)

*Primary Examiner* — Dave Misir
(74) *Attorney, Agent, or Firm* — Maschoff Brennan

(57) ABSTRACT

According to one or more embodiments, operations may include normalizing machine learning (ML) pipelines of existing ML projects stored in a corpus of existing ML projects. The operations may also include extracting functional blocks from the normalized ML pipelines. In addition, the operations may include assigning a label to each of the functional blocks in the normalized ML pipelines. Moreover, the operations may include indexing each of the ML pipelines in the corpus based on the labels assigned to the functional blocks. In addition, the operations may include utilizing the labels assigned to the functional blocks in the corpus to generate a new pipeline to perform a new ML task on a new dataset of a new ML project.

14 Claims, 21 Drawing Sheets

(56) References Cited

OTHER PUBLICATIONS

Zhou, Jian, Hongyu Zhang, and David Lo. "Where should the bugs be fixed? more accurate information retrieval-based bug localization based on bug reports." In 2012 34th International Conference on Software Engineering (ICSE), pp. 14-24. IEEE, 2012.

Saha, Ripon K., Lingming Zhang, Sarfraz Khurshid, and Dewayne E. Perry. "An information retrieval approach for regression test prioritization based on program changes." In 2015 IEEE/ACM 37th IEEE International Conference on Software Engineering, vol. 1, pp. 268-279. IEEE, 2015.

Bavishi, Rohan, Caroline Lemieux, Roy Fox, Koushik Sen, and Ion Stoica. "AutoPandas: neural-backed generators for program synthesis." Proceedings of the ACM on Programming Languages 3, No. OOPSLA (Oct. 10, 2019): 1-27.

Matthias Feurer, Aaron Klein, Katharina Eggensperger, Jost Springenberg, Manuel Blum, and Frank Hutter. 2015. Efficient and robust automated machine learning. In Advances in Neural Information Processing Systems. 2962-2970.

Randal S Olson, Nathan Bartley, Ryan J Urbanowicz, and Jason H Moore. 2016. Evaluation of a tree-based pipeline optimization tool for automating data science. In Proceedings of the 2016 on Genetic and Evolutionary Computation Conference. ACM, 485-492.

Agrawal, Hiralal, and Joseph R. Horgan. "Dynamic program slicing." ACM SIGPlan Notices 25.6 (1990): 246-256.

Zhang, Xiangyu, and Rajiv Gupta. "Cost effective dynamic program slicing." ACM SIGPLAN Notices 39.6 (2004): 94-106.

Linda Rosenberg, Lawrence Hyatt, "Software Quality Metrics for Object-Oriented Environments", Course Lecture, University of Calgary. 1996.

Pimentel, João Felipe, et al. "A large-scale study about quality and reproducibility of jupyter notebooks." 2019 IEEE/ACM 16th International Conference on Mining Software Repositories (MSR). IEEE, May 26, 2019.

Nguyen, Hoan Anh, et al. "A graph-based approach to API usage adaptation." ACM Sigplan Notices 45.10 (2010): 302-321.

Tempero, Ewan, et al. "The Qualitas Corpus: A curated collection of Java code for empirical studies." 2010 Asia Pacific Software Engineering Conference. IEEE, 2010.

Zhong, Hao, Tao Xie, Lu Zhang, Jian Pei, and Hong Mei. "MAPO: Mining and recommending API usage patterns." In European Conference on Object-Oriented Programming, pp. 318-343. Springer, Berlin, Heidelberg, 2009.

Fowkes, Jaroslav, and Charles Sutton. "Parameter-free probabilistic API mining across GitHub." In Proceedings of the 2016 24th ACM SIGSOFT international symposium on foundations of software engineering, pp. 254-265. 2016.

Wang, Tao, Gang Yin, Xiang Li, and Huaimin Wang. "Labeled topic detection of open source software from mining mass textual project profiles." In Proceedings of the First International Workshop on Software Mining, pp. 17-24. 2012.

McBurney, Paul W., and Collin McMillan. "Automatic source code summarization of context for java methods." IEEE Transactions on Software Engineering 42, No. 2 (2015): 103-119.

McMillan, Collin, Mark Grechanik, and Denys Poshyvanyk. "Detecting similar software applications." In 2012 34th International Conference on Software Engineering (ICSE), pp. 364-374. IEEE, 2012.

EP Search Report in Application No. 21191890.9 dated Jan. 27, 2022.

Zhong, Z. et al., "Practical Block-wise Neural Network Architecture Generation" 2018 IEEE/CVF Conference on Computer Vision and Pattern Recognition, May 14, 2018.

Yakovlev, A. et al., "Oracle AutoML: A Fast and Predictive AutoML Pipeline" Proceedings of the VLDB Endowment, vol. 13, No. 12, Aug. 2020.

Jin, H. et al., "Auto-Keras: An Efficient Neural Architecture Search System" Applied Data Science Track Paper, KDD 19, Aug. 4, 2019.

Smith, M. et al., "The Machine Learning Bazaar: Harnessing the ML Ecosystem for Effective System Development" Industry 2: Machine Learning and Analytics, SIGMOD '20, Jun. 14, 2020.

European Office Action dated Feb. 2, 2024 as received in application No. 21191890.9.

* cited by examiner

```
dataset = pd.read_csv("../input/adult.csv")
# Peek at data
dataset.head(4)

#Check for Null Data
dataset.isnull().sum()
# Replace All Null Data in NaN
dataset = dataset.fillna(np.nan)
# Count of >50K & <=50K
sns.countplot(dataset['income'],label="Count")
sns.plt.show()
:
# Correlation matrix between numerical values
g = sns.heatmap(dataset[numeric_features].corr(),
                annot=True, fmt = ".2f", cmap = "coolwarm")
sns.plt.show()
:
# Fill Missing Category Entries
dataset["workclass"] = dataset["workclass"].fillna("X")
dataset["occupation"] = dataset["occupation"].fillna("X")
dataset["native.country"] = dataset["native.country"].fillna("United-States")
:
# Convert Sex value to 0 and 1
dataset["sex"] = dataset["sex"].map({"Male": 0, "Female":1})
array = dataset.values X = array[:,0:8]
Y = array[:,8] print('Split Data: X')
print(X)
print('Split Data: Y')
print(Y)
validation_size = 0.20
seed = 7
num_folds = 10
scoring = 'accuracy'
X_train, X_validation, Y_train, Y_validation = train_test_split(X,Y,
                test_size=validation_size,random_state=seed)

# 5. Finalize Model # a) Predictions on validation dataset - KNN
random_forest = RandomForestClassifier(n_estimators=250,max_features=5)
random_forest.fit(X_train, Y_train)

predictions = random_forest.predict(X_validation)

print("Accuracy: %s%%" % (100*accuracy_score(Y_validation, predictions)))
```

*FIG. 8A*

```
dataset = pd.read_csv("../input/adult.csv")
# Peek at data
dataset.head(4)
```
} Debugging

```
#Check for Null Data
dataset.isnull().sum()
```
} Checks

```
# Replace All Null Data in NaN
dataset = dataset.fillna(np.nan)
# Count of >50K & <=50K
sns.countplot(dataset['income'],label="Count")
sns.plt.show()
```
} Graph Plotting

```
⋮
# Correlation matrix between numerical values
g = sns.heatmap(dataset[numeric_features].corr(),
                annot=True, fmt = ".2f", cmap = "coolwarm")
sns.plt.show()
⋮
# Fill Missing Category Entries
dataset["workclass"] = dataset["workclass"].fillna("X")
dataset["occupation"] = dataset["occupation"].fillna("X")
dataset["native.country"] = dataset["native.country"].fillna("United-States")
⋮
# Convert Sex value to 0 and 1
dataset["sex"] = dataset["sex"].map({"Male": 0, "Female":1})
array = dataset.values X = array[:,0:8]
Y = array[:,8] print('Split Data: X')
print(X)
print('Split Data: Y')
print(Y)
validation_size = 0.20
seed = 7
num_folds = 10
scoring = 'accuracy'

- from sklearn import cross_validation
+ from sklearn import model_selection
```
} API Adaptation

```
X_train, X_validation, Y_train, Y_validation = train_test_split(X,Y,
                test_size=validation_size,random_state=seed)

# 5. Finalize Model # a) Predictions on validation dataset - KNN
random_forest = RandomForestClassifier(n_estimators=250,max_features=5)
random_forest.fit(X_train, Y_train)

predictions = random_forest.predict(X_validation)
```
} Target

```
print("Accuracy: %s%%" % (100*accuracy_score(Y_validation, predictions)))
```

*FIG. 8B*

| Feature Class | Measures | Metric | Normalized metric ($f_i$) |
|---|---|---|---|
| Performance | Accuracy | F1 and R1 | As-is |
| Code Quality | Well documented | Comments to Code Ratio | Min(LOC_comments, LOC_code)/Max(LOC_comments, LOC_code) |
| | Modular | Average LOC per Cell | Min(LOC, target)/Max(LOC, target) |
| | Use standard APIs | Halstead complexity | $1/(1+x)$ |
| Community Metrics | Reputation | Number of Upvotes<br>Number of Forks<br>Reputation of Developer<br>[Number of Notebooks]<br>[Number of Followers] | $x/(1+x)$ |

*FIG. 9*

| Category | Intent | Metric | Normalization |
|---|---|---|---|
| Dataset | Size: # Rows | $< 10^2, < 10^3, < 10^4, < 10^5, >= 10^5$ | One-hot encode categories |
| | Size: # Columns | $<5, <10, <20, <40, <80, <160, <320, <640, >=640$ | One-hot encode categories |
| | Presence of missing values | Does any column have missing values? | As is |
| | Use standard APIs | Data has Integer columns? | As is (present or not) |
| | Presence of different types of data columns | Data has Int. category columns? | As is (present or not) |
| | | Data has Float columns? | As is (present or not) |
| | | Data has String columns? | As is (present or not) |
| | | Data has Str. category columns? | As is (present or not) |
| Notebook | Check if specific library APIs used | A feature for each library API used | As is: API used or not |

FIG. 10

Original ML Pipeline Code *1300*

```
# Next, we load our data.

dataset = pd.read_csv("adult.csv")
⋮
# Fill Missing Category Entries
dataset["workclass"] = dataset["workclass"].fillna("X")
dataset["occupation"] = dataset["occupation"].fillna("X")
dataset["native.country"] = dataset["native.country"].fillna("United-States")
⋮
# Convert Sex value to 0 and 1
dataset["sex"] = dataset["sex"].map({"Male": 0, "Female":1})
⋮
# Split-out Validation Dataset and Create Test Variables
array = dataset.values
X = array[:,0:8]
Y = array[:,8]
X_train, X_validation, Y_train, Y_validation = train_test_split(X,Y,
    test_size=0.2,random_state=7)
⋮ a) Predictions on validation dataset - KNN
random_forest = RandomForestClassifier(n_estimators=250,max_features=5)
random_forest.fit(X_train, Y_train)
predictions = random_forest.predict(X_validation)
```

*FIG. 13A*

Normalized ML Pipeline Code *1350*

```
# Next, we load our data.

_var_ = pd.read_csv("__str__")
⋮
# Fill Missing Category Entries
_var_["_str_category_"] = _var_["_str_category_"].fillna()
_var_["_str_category_"] = _var_["_str_category_"].fillna()
_var_["_str_category_"] = _var_["_str_category_"].fillna()
⋮
# Convert Sex value to 0 and 1
_var_["_str_category_"] = _var_["_str_category_"].map()
⋮
# Split-out Validation Dataset and Create Test Variables
_var_ = _var_.values
_var_ = array[:,0:8]
_var_ = array[:,8]
_var_, _var_, _var_, _var_ = train_test_split()
⋮ a) Predictions on validation dataset - KNN
_var_ = RandomForestClassifier()
_var_.fit()
_var_ = _var_.predict()
```

*FIG. 13B*

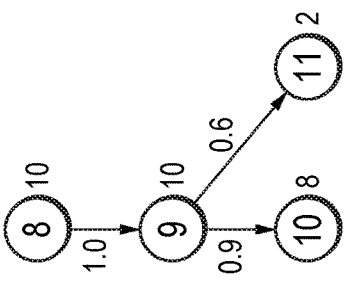

Single-Line Functional Blocks

Multi-Line Idioms

Multi-Line Functional Blocks

Next, we load our data.
1. _var_ = pd.read_csv("__str__")
... # Fill Missing Category Entries
2. _var_[" _str_category_ "] = _var_[" _str_category_ "].fillna()   x3
... # Convert Sex value to 0 and 1
3. _var_[" _str_category_ "] = _var_[" _str_category_ "].map()
... # Split-out Validation Dataset and Create Test Variables
4. _var_ = _var_.values
5. _var_ = array[:,0:8]
6. _var_ = array[:,8]
7. _var_, _var_, _var_, _var_ = train_test_split()
... # a) Predictions on validation dataset - KNN
8. _var_ = RandomForestClassifier()
9. _var_.fit()
10. _var_ = _var_.predict()

*FIG. 15*

Block-1

_var_ = StandardScaler()
_var1_ = _var_.fit_transform()

Block-2

_var_ = MinMaxScaler()
_var1_ = _var_.fit_transform()

Comment Extraction

Notebook-1: # Scale the data to be between -1 and 1
Notebook-2: # Applying Standard scaling to get optimized result
Notebook-3: # Scaling Numerical columns data
Notebook-4: BLANK_COMMENT

Mining From Alternative Source

Notebook-4: Standardize features by removing the mean and scaling to unit variance

Annotate Parts-Of-Speech and Step 3.a.4: Processing

Verb  Noun

Notebook-1: *scale data*
Notebook-2: *apply standard*
Notebook-3: *scale numerical columns data*
Notebook-4: *standard feature remove mean scale unit variance*

Label: Scale Standard Data          Label: Scale Data Feature

Label: Scale Data

Similarity Score: 0.67

*FIG. 17*

| Functional Blocks | Main | Supporting | |
|---|---|---|---|
| | Mushroom Classification | World Happiness Report 2019 | Cardio |
| Read Data | 1 | 1 | 1 |
| Fill Missing Values | 0 | 1 | 0 |
| Convert Category To Number | 1 | 0 | 0 |
| Convert String To Number | 0 | 0 | 0 |
| Split Train Test | 1 | 1 | 1 |
| Random Forest | 1 | 0 | 0 |
| Decision Tree Regressor | 0 | 1 | 0 |
| Gaussian NB | 0 | 0 | 1 |

Pipeline Skeleton 2002
- Read Data
- Fill Missing Values
- Convert String To Int
- Split Train Test
- Random Forest

US 12,039,419 B2

AUTOMATICALLY LABELING FUNCTIONAL BLOCKS IN PIPELINES OF EXISTING MACHINE LEARNING PROJECTS IN A CORPUS ADAPTABLE FOR USE IN NEW MACHINE LEARNING PROJECTS

FIELD

The embodiments discussed in the present disclosure are related to automatically labeling functional blocks in pipelines of existing machine learning projects in a corpus adaptable for use in new machine learning projects.

BACKGROUND

Machine learning (ML) generally employs ML models that are trained with training data to make predictions that automatically become more accurate with ongoing training. ML may be used in a wide variety of applications including, but not limited to, traffic prediction, web searching, online fraud detection, medical diagnosis, speech recognition, email filtering, image recognition, virtual personal assistants, and automatic translation.

As ML has become increasingly common, there is often a scarcity of ML experts (e.g., skilled data scientists) available to implement new ML projects. For example, by some estimates, the vast majority of data scientist currently tasked with developing new ML projects are non-experts (e.g., relatively unskilled or novice), with only around 2 in 5 having a masters or doctoral degree that would qualify them for increasingly complex ML project development.

Automated ML (AutoML) is the process of automating the process of applying ML to real-world problems. AutoML may allow non-experts to make use of ML models and techniques without requiring them to first become ML experts. AutoML has been proposed as a solution to the ever-growing challenge of implementing new ML projects even though there is a scarcity of ML experts. However, current AutoML solutions offer only simplistic and partial solutions that are insufficient to enable non-experts to fully implement new ML projects.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, operations may include normalizing machine learning (ML) pipelines of existing ML projects stored in a corpus of existing ML projects. The operations may also include extracting functional blocks from the normalized ML pipelines. In addition, the operations may include assigning a label to each of the functional blocks in the normalized ML pipelines. Moreover, the operations may include indexing each of the ML pipelines in the corpus based on the labels assigned to the functional blocks. In addition, the operations may include utilizing the labels assigned to the functional blocks in the corpus to generate a new pipeline to perform a new ML task on a new dataset of a new ML project.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 8A illustrates example ML pipeline code of an existing ML project;

FIG. 8B illustrates example cleaned ML pipeline code resulting from the example ML pipeline code of FIG. 8A having been cleaned;

FIG. 9 is a table of example quality features;

FIG. 10 is a table of example diversity features;

FIG. 13A illustrates example original ML pipeline code of an existing ML project before normalization;

FIG. 13B illustrates example normalized ML pipeline code after normalization of the example original ML pipeline code of FIG. 13A;

FIG. 15 illustrates extracting functional blocks from a normalized ML pipeline using directed graphs;

FIG. 17 illustrates automatic labeling of functional block in ML pipelines;

DESCRIPTION OF EMBODIMENTS

Figure 1:
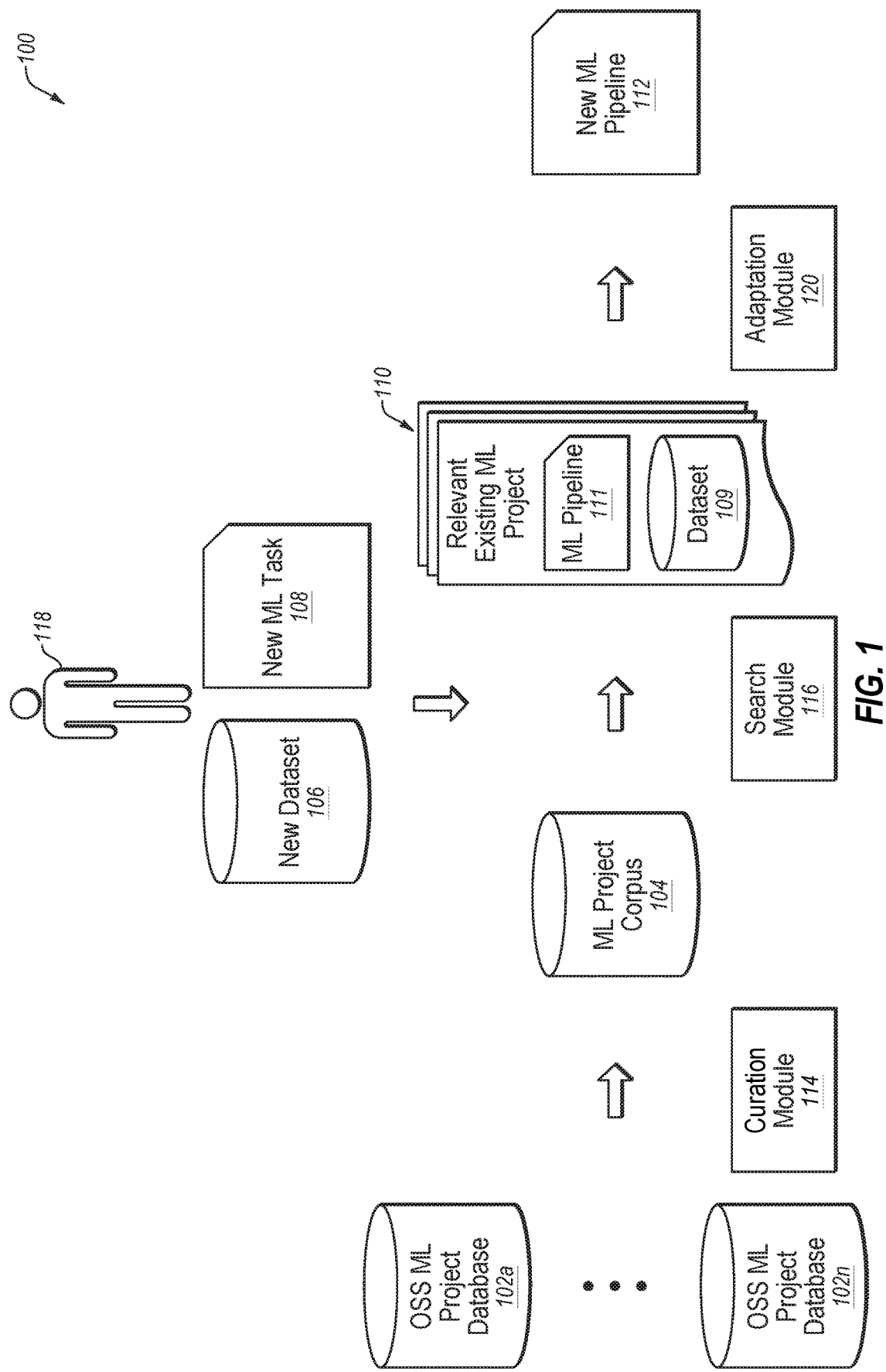
FIG. 1 is a diagram representing an example environment related to automatically searching for and adapting existing ML projects into new ML projects.

Some embodiments described in the present disclosure relate to methods and systems of automatically searching for and adapting existing ML projects into new ML projects.

As ML has become increasingly common, there is often a scarcity of ML experts (e.g., skilled data scientists) available to implement new ML projects. Although various AutoML solutions (e.g. Auto-Sklearn, AutoPandas, etc.) have been proposed to resolve the ever-growing challenge of implementing new ML projects with a scarcity of ML experts, current AutoML solutions offer only simplistic and partial solutions that are insufficient to enable non-experts to fully implement new ML projects. Further, although open source software (OSS) databases of existing ML projects (e.g., Kaggle, GitHub, etc.) have also been proposed as another solution for the challenge of implementing new ML projects by non-experts, it can be difficult or impossible for a non-expert to find a potentially useful existing ML project in these databases. Further, even if the non-expert should succeed in finding a potentially useful existing ML project in these databases, it can be difficult or impossible for the non-expert to modify the potentially useful existing ML project for the new requirements of a new ML project.

In the present disclosure, the term "ML project" may refer to a project that includes a dataset, an ML task defined on the dataset, and an ML pipeline (e.g., a script or program code) that is configured to implement a sequence of operations to train a ML model, on the dataset, for the ML task and use the ML model for new predictions. In the present disclosure, the term "computational notebook" may refer to a computational structure used to develop and/or represent ML pipelines, especially during the development phase (e.g., a Jupyter notebook). Although embodiments disclosed herein are illustrated with ML pipelines in the Python programming language and computational notebooks structured as Jupyter notebooks, it is understood that other embodiments may include ML pipelines written in different languages and computational notebooks structured in other platforms.

According to one or more embodiments of the present disclosure, operations may be performed to automatically search for and adapt existing ML projects into new ML projects. For example, in some embodiments a computer system may organically support the natural workflow of data-scientists by building on a "search-and-adapt" style work-flow where a data-scientist would first search for existing ML projects that can serve as good starting point for building a new ML project and then suitably adapt the existing ML projects to build an ML pipeline for a new dataset and a new ML task of a new ML project.

For example, in some embodiments a computer system may automatically mine raw ML projects from OSS databases of existing ML projects and may automatically curate the raw ML projects prior to storing them in a corpus of existing ML projects. In some embodiments, this mining and curation of existing ML projects from large-scale repositories may result in a corpus of diverse, high-quality existing ML projects that can be used in a search-and-adapt workflow. Also, this curation may involve cleaning the ML pipelines of the existing ML projects (e.g., using dynamic program slicing) and may involve computing a set of features to capture quality and diversity of each ML project and to select an optimal number of existing ML projects consistent with these goals.

Also, in some embodiments, this curation may entail operations performed to automatically identify and index functional blocks in the ML pipelines of the existing ML projects. Unlike traditional software programs, ML pipelines of ML projects generally follow a well-defined workflow based on the dataset properties, and can be viewed as a sequence of functional blocks. Therefore, some embodiments involve a technique to automatically extract and label functional blocks in ML pipelines to index them properly in the corpus so that they can be efficiently searched to synthesize a new ML pipeline for a new ML task. More particularly, this technique may abstract the ML pipelines at an appropriate level and may employ a graph-based sequence mining algorithm to extract both custom and idiomatic functional blocks. Finally, each functional block may be labelled semantically.

In some embodiments, upon receipt of a new dataset and a new ML task for a new ML project, such as from a non-expert data scientist, the computer system may automatically use a hierarchical approach to first synthesize a functional block-level pipeline skeleton for the new ML project using an ML model and then may explicitly search through the curated and labeled corpus to identify relevant existing ML projects to instantiate this pipeline skeleton. Next, the computer system may automatically select functional blocks from ML pipelines of the set of relevant existing ML projects to concretize the pipeline skeleton into a new ML pipeline for the new ML project. Finally, the computer system may adapt the functional blocks of the new ML pipeline to enable the new ML pipeline to be executed to perform the new ML task on the new dataset.

Therefore, in some embodiments, a non-expert data scientist may merely formulate a new dataset and a new ML task for a new ML project, and the computer system may then implement a tool-assisted, interactive search-and-adapt work flow to automatically generate a new ML pipeline for the ML project that can be immediately executed to perform the new ML task on the new dataset, without any modification by the non-expert data scientist. Thus, some embodiments may empower novice data scientists to efficiently create new high-quality end-to-end ML pipelines for new ML projects.

According to one or more embodiments of the present disclosure, the technological field of ML project development may be improved by configuring a computing system to automatically search for and adapt existing ML projects into new ML projects, as compared to tasking a data scientist (e.g., who is often a non-expert) to manually find a potentially useful existing ML project and modify the potentially useful existing ML project for the new requirements of a new ML project. Such a configuration may allow the computing system to better search for relevant existing ML projects and adapt them into new ML projects by identifying and extracting functional blocks from existing ML pipelines and automatically adapting them for use in new ML pipelines.

Embodiments of the present disclosure are explained with reference to the accompanying drawings.

FIG. 1 is a diagram representing an example environment 100 related to automatically searching for and adapting existing ML projects into new ML projects, arranged in accordance with at least one embodiment described in the present disclosure. The environment 100 may include OSS ML project databases 102a-102n, a curation module 114 configured to curate exiting ML projects into an ML project corpus 104, a search module configured to search for relevant existing ML projects 110 from the ML project corpus 104 for a new ML project based on a new dataset 106 and a new ML task 108 of the new ML project (e.g., that were provided by a data scientist 118), and an adaptation module

120 configured to synthesize and adapt functional blocks from ML pipelines 111 of relevant existing ML projects 110 into a new ML pipeline 112 of the new ML project.

The OSS ML project databases 102a-102n may be large-scale repositories of existing ML projects, with each ML project including include electronic data that includes at least a dataset, an ML task defined on the dataset, and an ML pipeline (e.g., a script or program code) that is configured to implement a sequence of operations to train an ML model for the ML task and to use the ML model for new predictions. Some examples of large-scale repositories of existing ML projects include, but are not limited to, Kaggle and GitHub. In some embodiments, each ML project in an OSS ML project databases 102a-102n may include a computational notebook, which may be a computational structure used to develop and/or represent ML pipelines, especially during the development phase. One example of a computational notebook is a Jupyter notebook.

Each of the curation module 114, the search module 116, and the adaptation module 120 may include code and routines configured to enable a computing device to perform one or more operations. Additionally or alternatively, each of these modules may be implemented using hardware including a processor, a microprocessor (e.g., to perform or control performance of one or more operations), a field-programmable gate array (FPGA), or an application-specific integrated circuit (ASIC). In some other instances, each of the modules may be implemented using a combination of hardware and software. In the present disclosure, operations described as being performed by the each of these modules may include operations that the module may direct a corresponding system to perform.

The curation module 114 may be configured to perform a series of operations with respect to existing ML projects stored in the OSS ML project databases 102a-102n prior to or after storing the existing ML projects in the ML project corpus 104. For example, the curation module 114 may be configured to automatically mine raw ML projects from the OSS ML project databases 102a-102n in order to automatically curate the raw ML projects prior to or after storing them in the ML project corpus 104. The ML project corpus 104 may be a repository of existing ML projects that were curated from the OSS ML project databases 102a-102n. In some embodiments, the ML project corpus 104 may be a large-scale corpus of cleaned, high-quality, indexed existing ML projects that may be employed in an automated "search-and-adapt" style work-flow. In this style of workflow, the searching may involve identifying existing ML project(s) that are relevant to a new ML task and a new dataset and that are to be used as "seeds" to build a new ML project, including a new ML pipeline. Further, in this style of workflow, the adapting may involve using an interactive and synthesis approach to adapt the relevant existing ML project(s) to generate the new ML pipeline of the new ML project.

In some embodiments, the curation module 114 may be configured to mine and curate existing ML projects so that only diverse and high-quality existing ML projects are stored in the ML project corpus 104. Also, in some embodiments, the curation module 114 may be configured to clean the ML pipelines of the existing ML projects (e.g., using dynamic program slicing). Further, in some embodiments, the curation module 114 may be configured to compute a set of features to capture quality and diversity of each ML project and to select an optimal number of existing ML projects from the OSS ML project databases 102a-102n to store in the ML project corpus 104. Moreover, in some embodiments, the curation module 114 may be configured to automatically identify and index functional blocks in the ML pipelines of the existing ML projects. Unlike traditional software programs, ML pipelines of ML projects generally follow a well-defined workflow based on the dataset properties, and can be viewed as a sequence of functional blocks. Therefore, the curation module 114 may be configured to automatically extract and label functional blocks (e.g., using a semantic label such as "read data") in ML pipelines to index them properly in the ML project corpus 104 so that they can be efficiently searched to synthesize the new ML pipeline 112 for the new dataset 106 and the new ML task 108. More particularly, the curation module 114 may be configured to abstract the ML pipelines at an appropriate level and may employ a graph-based sequence mining algorithm to extract both custom and idiomatic functional blocks. Finally, the curation module 114 may be configured to generate and assign a semantic label to each functional block.

The search module 116 may be configured to perform a series of operations with respect to searching through existing ML projects stored in the ML project corpus 104. For example, the search module 116 may be configured to receive the new dataset 106 and the new ML task 108 for a new ML project, such as from the data scientist 118. The, upon receipt, the search module 116 may be configured to automatically use a hierarchical approach to first synthesize a functional block-level pipeline skeleton for the new ML project using an ML model and then may be configured to explicitly search through the ML project corpus 104 to identify relevant existing ML projects 110 from which to instantiate this pipeline skeleton.

The adaptation module 120 may be configured to perform a series of operations with respect to synthesizing and adapting function blocks from the ML pipelines 111 of the relevant existing ML projects 110 into the new ML pipeline 112. For example, the adaptation module 120 may be configured to automatically select functional blocks from the ML pipelines 111 to concretize the pipeline skeleton into the new ML pipeline 112 for the new ML project (e.g., which includes the new dataset 106, the new ML task 108, and the new ML pipeline 112). Further, the adaptation module 120 may be configured to adapt the functional blocks of the new ML pipeline 112 to enable the new ML pipeline 112 to be executed to perform the new ML task 108 on the new dataset 106.

Therefore, in some embodiments, the data scientist 118, who may be a non-expert, may merely formulate the new dataset 106 and the new ML task 108 for a new ML project, and the curation module 114, the search module 116, and the adaptation module 120 may function together (e.g., by performing one or more of the methods disclosed herein) to ultimately generate the new ML pipeline 112 for the new ML project that can be immediately executed to perform the new ML task 108 on the new dataset 106 without any modification by the data scientist 118.

Modifications, additions, or omissions may be made to FIG. 1 without departing from the scope of the present disclosure. For example, the environment 100 may include more or fewer elements than those illustrated and described in the present disclosure.

Figure 2:
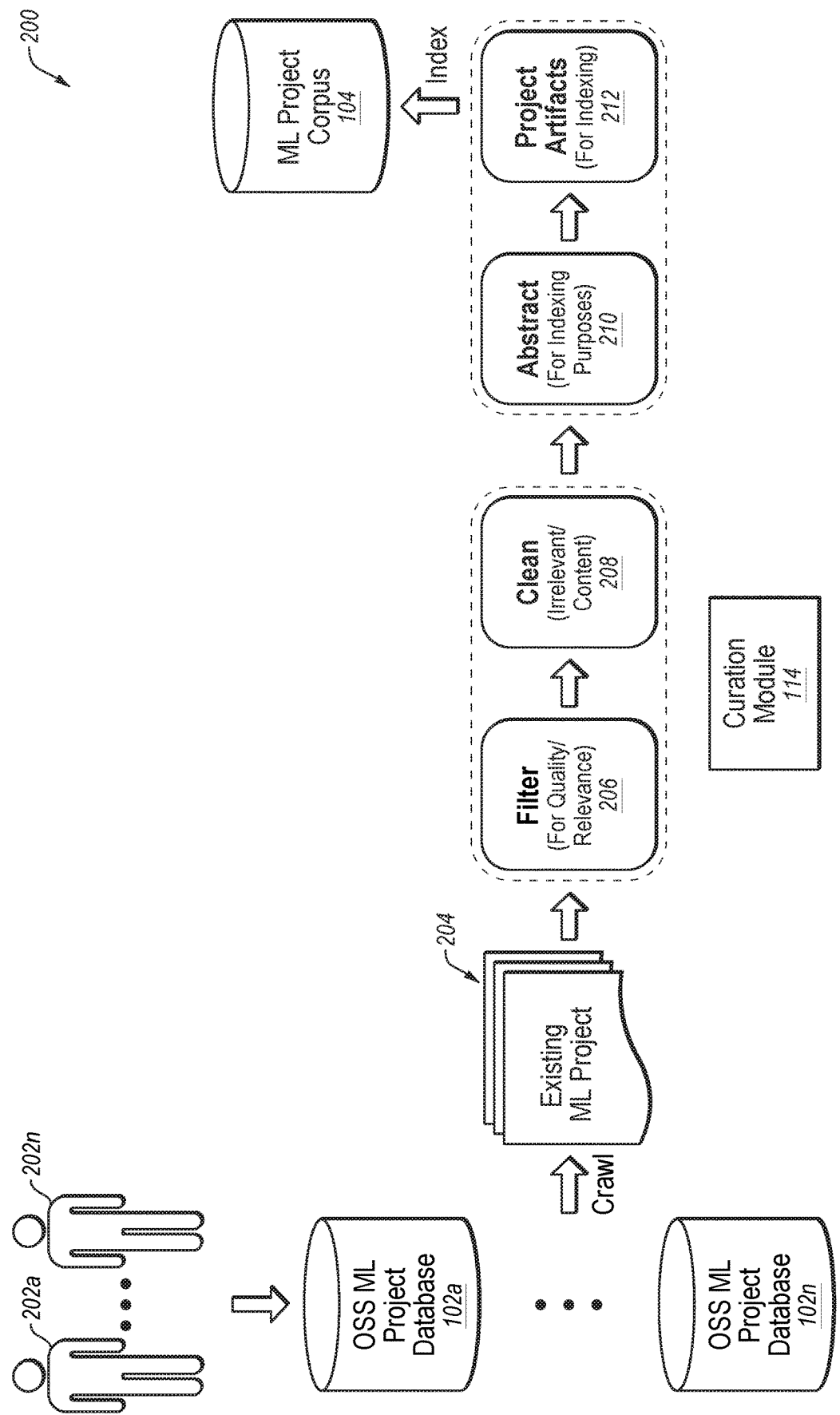
FIG. 2 is a diagram representing an example environment related to automatically curating existing ML projects into a corpus.

FIG. 2 is a diagram representing an example environment 200 related to automatically curating existing ML projects into a corpus, arranged in accordance with at least one embodiment described in the present disclosure. Similar to the environment 100 of FIG. 1, the environment 200 may include the OSS ML project databases 102a-102n, the curation module 114, and the ML project corpus 104.

Further, as disclosed in the environment 200, after data scientists 202a-202n have stored existing ML projects 204 in the OSS ML project databases 102a-102n, the curation module 114 may be configured to crawl the OSS ML project databases 102a-102n to generate a set of existing ML projects 204. This set of existing ML projects 204 may then be further analyzed by the curation module 114.

While further analyzing the existing ML projects 204, the curation module 114 may be configured to filter 206 the existing ML projects 204 for quality and relevance, and clean 208 the existing ML projects 204 to identify and/or remove irrelevant content. This filtering 206 and cleaning 208 may be configured to overcome various challenges in the existing ML projects 204. For example, some computational notebooks of some of the existing ML projects 204 may not have a sufficiently high quality to build a high quality ML project corpus. Therefore, this filtering 206 may automatically identify higher quality computational notebooks (e.g., that use standard APIs rather than custom code, that use appropriate classifiers, and that have high accuracy) for including in the ML project corpus 104. Further, a high quality ML project corpus should include existing ML projects that have diverse computational notebooks. Therefore, this filtering 206 may automatically identify more diverse computational notebooks for including in the ML project corpus 104. Also, ML pipelines in computational notebooks of the existing ML projects 204 may be noisy in general, such as Jupyter notebooks that may have a considerable amount of irrelevant code (e.g., debugging code, visualization code, and/or experimental code) or deprecated APIs rendering otherwise good-quality code un-executable. Therefore, this cleaning 208 may automatically clean ML pipelines in computational notebooks to resolve noise (e.g., irrelevant code and/or deprecated APIs). Irrelevant code may be resolved by marking out portions of the code that do not programmatically contribute to the overall ML pipeline and would therefore add noise to the overall technique. Deprecated APIs may be resolved using API adaptation techniques to automatically replace deprecated APIs with new APIs.

Further, the curation module 114 may be configured to abstract 210 the cleaned and filtered existing ML projects to produce project artifacts 212 of the existing ML projects 204 for indexing purposes. This abstracting 210 and the project artifacts 212 thus produced may be configured to overcome various challenges in the existing ML projects 204. For example, it can be a challenge to represent ML pipeline code in the ML project corpus 104 in a way that facilitates a better search. Therefore, this abstracting 210 may automatically identify functional blocks in the ML pipeline code and also identify mappings between certain meta-features in the dataset and the functional blocks. Further, it can be a challenge to determine appropriate levels of abstraction to find functional blocks, such that functional blocks can be identified in arbitrary lines of code. Therefore, this abstracting 210 may automatically identify functional blocks based on the insights that ML pipelines often heavily rely on APIs, similar functional blocks often include similar set of APIs, and the structure of computational notebooks (e.g., Jupyter notebooks) may also provide important information about functional blocks. Also, it can be a challenge to extract a semantic purpose of each functional block and to use semantic labels to identify alternative implementations of a particular functionality. Therefore, the abstraction 210 may leverage information derived from the markdown cell of computational notebooks (e.g., Jupyter notebooks), source code comments, and the documentation of library APIs provide to automatically generate semantic labels and to later use the semantic labels to identify functional blocks that are functionally equivalent even though they use different syntax. In this manner, alternate implementations of a functional block can be identified and grouped together (e.g., this grouping may be referred to as "clustering").

Finally, before and/or after the filtering 206, cleaning 208, and abstracting 210 to produce the project artifacts 212 (e.g., by performing one or more of the methods disclosed herein), the curation module 114 may be configured to store the curated existing ML project 204 in the ML project corpus 104. Therefore, in some embodiments, the environment 200 may be employed to automatically curate existing ML projects into the ML project corpus 104 to enable the existing ML projects to be later searched and adapted into new ML projects.

Modifications, additions, or omissions may be made to FIG. 2 without departing from the scope of the present disclosure. For example, the environment 200 may include more or fewer elements than those illustrated and described in the present disclosure.

Figure 3:
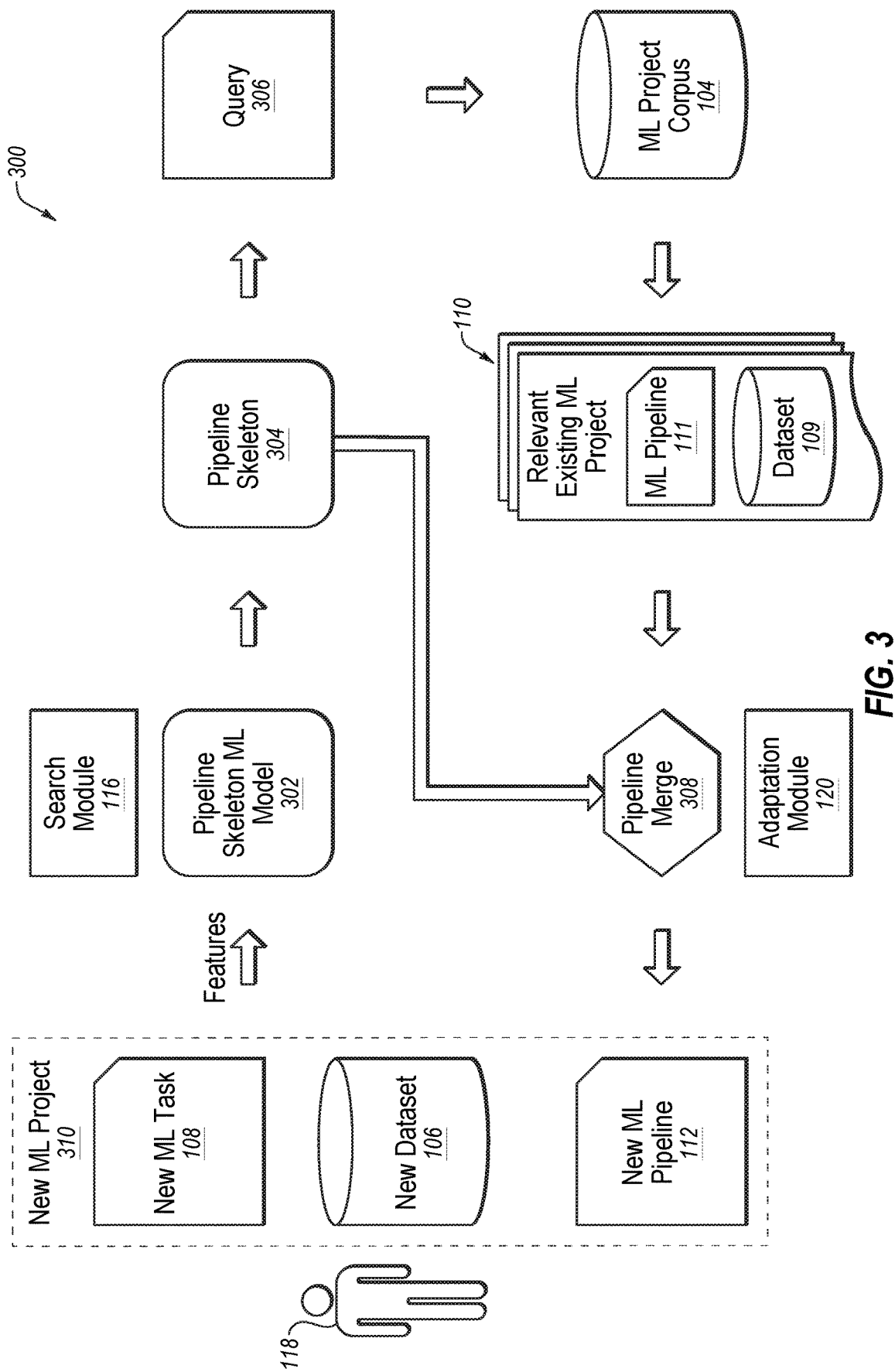
FIG. 3 is a diagram representing an example environment related to automatically generating a pipeline of a new ML project from pipelines of existing ML projects stored in a corpus.

FIG. 3 is a diagram representing an example environment 300 related to automatically generating a pipeline of a new ML project from pipelines of existing ML projects stored in a corpus. Similar to the environment 100 of FIG. 1, the environment 300 may include the ML project corpus 104, the new dataset 106, the new ML task 108, the relevant existing ML projects 110, the new ML pipeline 112, the search module 116, and the adaptation module 120. Further, as disclosed in the environment 300, after existing ML projects have been stored in the ML project corpus 104, the search module 116 may be configured to receive the new dataset 106 and the new ML task 108 for a new ML project 310, such as from the data scientist 118. Then, the search module 116 may be configured to employ a pipeline skeleton ML model 302 (which may have been previously trained using training data derived from the ML project corpus 104) to synthesize a functional block-level pipeline skeleton 304 for the new ML project 310.

Next, the search module 116 may be configured to generate a query 306 based on the pipeline skeleton 304 to search through the curated and labeled ML project corpus 104 for the relevant existing ML projects 110. This query 306 may be configured to overcome various challenges. For example, it can be challenging to formulate an effective query from the new dataset 106 and the new ML task 108. Therefore, the query 306 may be formulated based on the insight that there is often a mapping between certain meta-features in the new dataset 106 along with the new ML task 108 and the set of functional blocks that an ML pipeline solution for this dataset and task should include. Therefore, the set of functional blocks included in the pipeline skeleton 304 can form the basis of the query 306.

Next, the search module 116 may be configured to search the ML project corpus 104 based on the query 306. This search may be configured to overcome various challenges. For example, it may be challenging to identify the best computational notebooks in the existing ML projects of the ML project corpus 104 to adapt, among many other relevant computational notebooks. Therefore, the search may be formulated based on the insight that there may be many computational notebooks that have the required functional blocks for the new ML pipeline 112, so a compact set of computational notebooks having all the necessary semantic labels may be identified during the search while ensuring quality.

Next, in some embodiments, the adaptation module 120 may be configured to perform a pipeline merge 308 of functional blocks from the ML pipelines 111 of the relevant existing ML projects 110 to create the new ML pipeline 112. This pipeline merge 308 may be configured to overcome various challenges. For example, it can be challenging to merge all the computational notebooks so that the resulting code is syntactically correct and is a suitable solution for the new dataset 106 and the new ML task 108. Therefore, the pipeline merge 308 may be configured to employ the pipeline skeleton 304 (as indicated by the arrow from the pipeline skeleton 304 to the pipeline merge 308) and program analysis may be employed to make the code of the new ML pipeline 112 syntactically correct, and thus executable without further modification.

Therefore, in some embodiments, the data scientist 118, who may be a non-expert, may merely formulate the new dataset 106 and the new ML task 108 for the new ML project 310, and the search module 116 and the adaptation module 120 may function together (e.g., by performing one or more of the methods disclosed herein) to ultimately generate the new ML pipeline 112 for the new ML project 310 that can be immediately executed to perform the new ML task 108 on the new dataset 106, in some without any further modification by the data scientist 118.

Modifications, additions, or omissions may be made to FIG. 3 without departing from the scope of the present disclosure. For example, the environment 300 may include more or fewer elements than those illustrated and described in the present disclosure.

Figure 4:
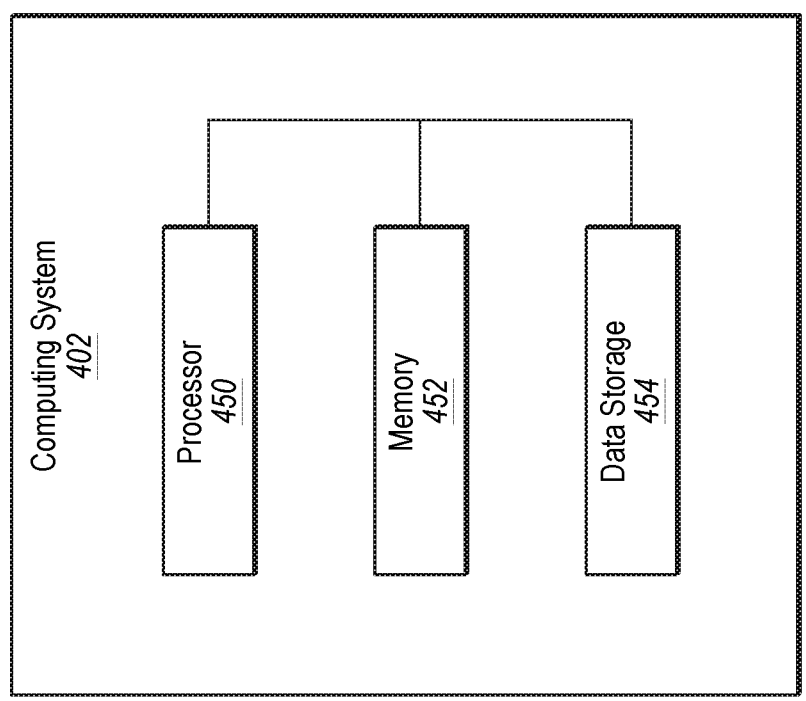
FIG. 4 illustrates a block diagram of an example computing system.

FIG. 4 illustrates a block diagram of an example computing system 402, according to at least one embodiment of the present disclosure. The computing system 402 may be configured to implement or direct one or more operations associated with one or more modules (e.g., the curation module 114, the search module 116, or the adaptation module 120 of FIGS. 1-3, or some combination thereof). The computing system 402 may include a processor 450, a memory 452, and a data storage 454. The processor 450, the memory 452, and the data storage 454 may be communicatively coupled.

In general, the processor 450 may include any suitable special-purpose or general-purpose computer, computing entity, or processing device including various computer hardware or software modules and may be configured to execute instructions stored on any applicable computer-readable storage media. For example, the processor 450 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, the processor 450 may include any number of processors configured to, individually or collectively, perform or direct performance of any number of operations described in the present disclosure. Additionally, one or more of the processors may be present on one or more different electronic devices, such as different servers.

In some embodiments, the processor 450 may be configured to interpret and/or execute program instructions and/or process data stored in the memory 452, the data storage 454, or the memory 452 and the data storage 454. In some embodiments, the processor 450 may fetch program instructions from the data storage 454 and load the program instructions in the memory 452. After the program instructions are loaded into memory 452, the processor 450 may execute the program instructions.

For example, in some embodiments, one or more of the above mentioned modules (e.g., the curation module 114, the search module 116, or the adaptation module 120, or some combination thereof) may be included in the data storage 454 as program instructions. The processor 450 may fetch the program instructions of a corresponding module from the data storage 454 and may load the program instructions of the corresponding module in the memory 452. After the program instructions of the corresponding module are loaded into memory 452, the processor 450 may execute the program instructions such that the computing system may implement the operations associated with the corresponding module as directed by the instructions.

The memory 452 and the data storage 454 may include computer-readable storage media for carrying or having computer-executable instructions or data structures stored thereon. Such computer-readable storage media may include any available media that may be accessed by a general-purpose or special-purpose computer, such as the processor 450. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer.

Combinations of the above may also be included within the scope of computer-readable storage media. Computer-executable instructions may include, for example, instructions and data configured to cause the processor 450 to perform a certain operation or group of operations.

Modifications, additions, or omissions may be made to the computing system 402 without departing from the scope of the present disclosure. For example, in some embodiments, the computing system 402 may include any number of other components that may not be explicitly illustrated or described.

Figure 5:
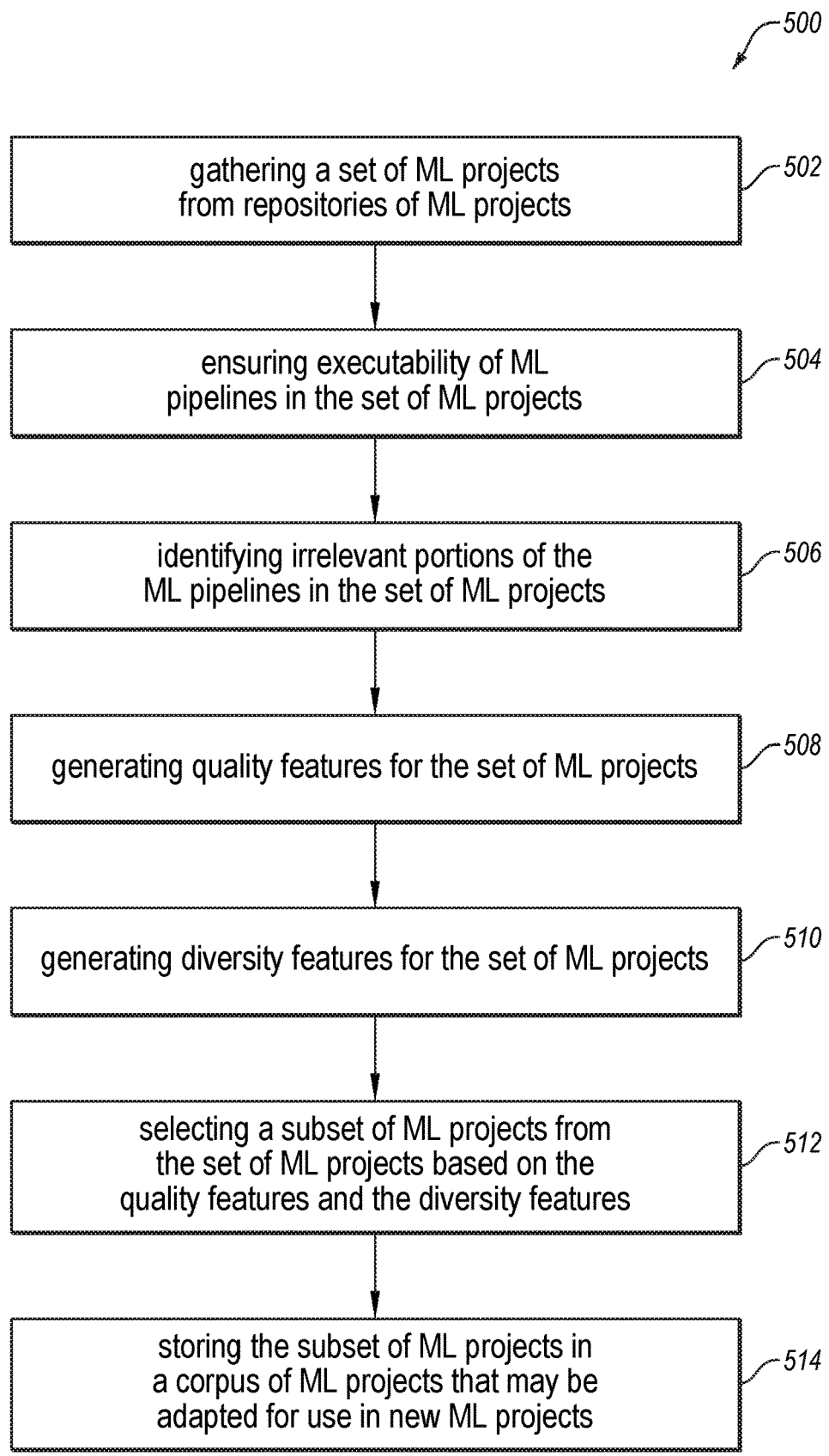
FIG. 5 is a flowchart of an example method of automatically curating existing ML projects into a corpus adaptable for use in new ML projects.

FIG. 5 is a flowchart of an example method 500 of automatically curating existing ML projects into a corpus adaptable for use in new ML projects, according to at least one embodiment described in the present disclosure. The method 500 may be performed by any suitable system, apparatus, or device. For example, the curation module 114 of FIGS. 1-2 or the computing system 402 of FIG. 4 (e.g., as directed by one or more modules) may perform one or more of the operations associated with the method 500. Although illustrated with discrete blocks, the steps and operations associated with one or more of the blocks of the method 500 may be divided into additional blocks, combined into fewer blocks, or eliminated, depending on the particular implementation.

In some embodiments, the method 500 may be employed by the curation module 114 to filter 206 and clean 208 the existing ML projects 204, prior to storing a subset of the existing ML projects 204 in the ML project corpus 104, as illustrated in FIG. 2.

The method 500 may include, at block 502, gathering a set of ML projects from repositories of ML projects. In some embodiments, this gathering may be based on a filtering criteria. For example, the curation module 114 may gather a set of the existing ML projects 204 from the OSS ML project databases 102a-102n based on a filtering criteria. In some embodiments, the set of ML projects may be gathered according to one or more operations of the method 600 described in further detail below with respect to FIG. 6.

The method 500 may include, at block 504, ensuring executability of ML pipelines in the set of ML projects. For example, the curation module 114 may ensure executability of the set of the existing ML projects 204. In some embodiments, the executability of the ML pipelines may be ensured according to one or more operations of the method 700 described in further detail below with respect to FIG. 7. Further, in some embodiments, the executability of the ML pipelines may be ensured as illustrated in the ML pipelines 800 and 850 of FIGS. 8A and 8B as described in further detail below.

The method 500 may include, at block 506, identifying irrelevant portions of the ML pipelines in the set of ML projects. For example, the curation module 114 may identify and annotate irrelevant portions of the set of the existing ML projects 204. In some embodiments, the irrelevant portions of the ML pipelines may be identified as illustrated in the ML pipelines 800 and 850 of FIGS. 8A and 8B as described in further detail below.

The method 500 may include, at block 508, generating quality features for the set of ML projects. For example, the curation module 114 may generate quality features for the set of the existing ML projects 204. In some embodiments, the quality features may be generated as illustrated in the table 900 of FIG. 9 as described in further detail below.

The method 500 may include, at block 510, generating diversity features for the set of ML projects. For example, the curation module 114 may generate diversity features for the set of the existing ML projects 204. In some embodiments, the diversity features may be generated as illustrated in the table 1000 of FIG. 10 as described in further detail below.

The method 500 may include, at block 512, selecting a subset of ML projects from the set of ML projects based on the quality features and the diversity features. For example, the curation module 114 may select a subset of ML projects from the set of the existing ML projects 204 based on the quality features and the diversity features. In some embodiments, the subset of ML projects may be selected from the set of ML projects according to one or more operations of the method 1100 described in further detail below with respect to FIG. 11.

The method 500 may include, at block 514, storing the subset of ML projects in a corpus of ML projects that may be adapted for use in new ML projects. For example, the curation module 114 may store the subset of the existing ML projects 204 in the ML project corpus 104 that may be adapted for use in new ML projects (such as the new ML project 310).

Modifications, additions, or omissions may be made to the method 500 without departing from the scope of the present disclosure. For example some of the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the disclosed embodiments.

Figure 6:
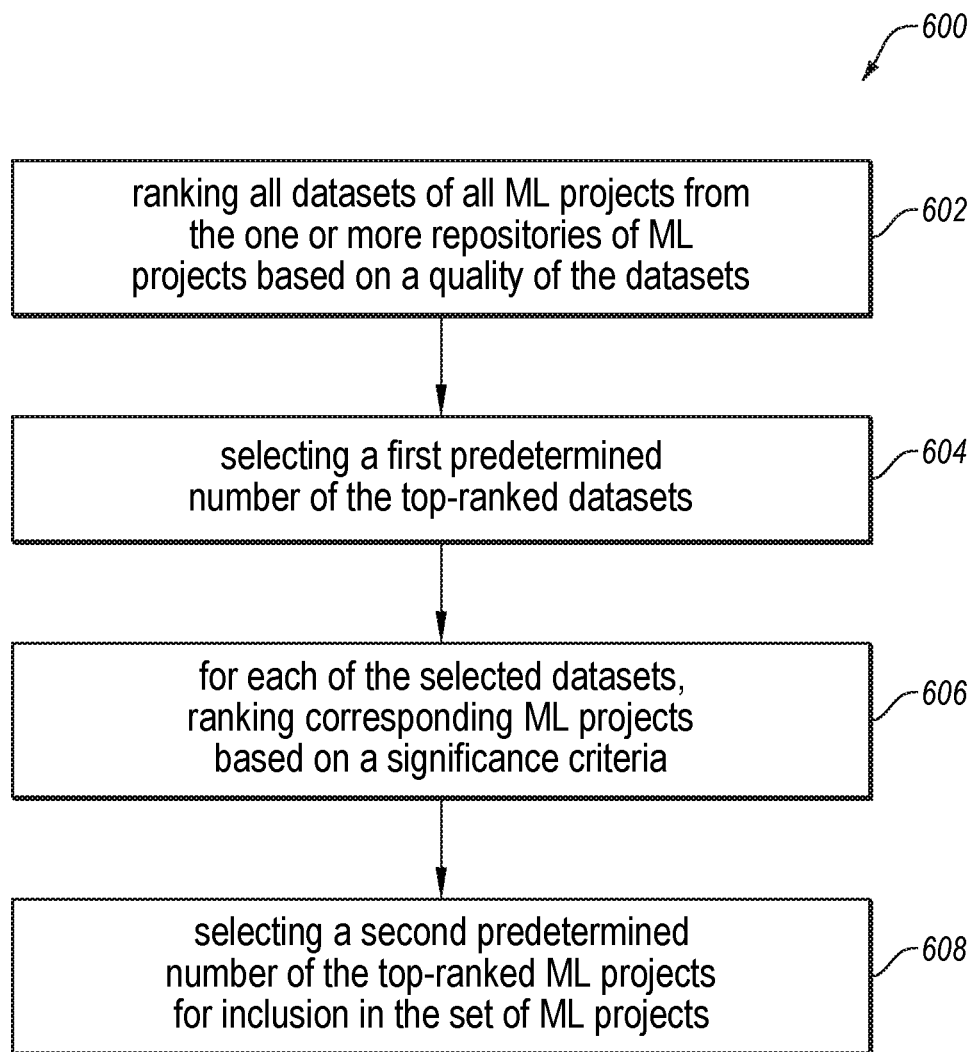
FIG. 6 is a flowchart of an example method of gathering a set of ML projects from one or more repositories of ML projects based on a filtering criteria.

FIG. 6 is a flowchart of an example method 600 of gathering a set of ML projects from one or more repositories of ML projects based on a filtering criteria, according to at least one embodiment described in the present disclosure. In some embodiments, the operations of block 502 described above with respect to the method 500 of FIG. 5 may be performed according to the method 600.

The method 600 may be performed by any suitable system, apparatus, or device. For example, the curation module 114 of FIGS. 1-2 or the computing system 402 of FIG. 4 (e.g., as directed by one or more modules) may perform one or more of the operations associated with the method 600. Although illustrated with discrete blocks, the steps and operations associated with one or more of the blocks of the method 600 may be divided into additional blocks, combined into fewer blocks, or eliminated, depending on the particular implementation.

The method 600 may include, at block 602, ranking all datasets of all ML projects from the one or more repositories of ML projects based on a quality of the datasets. For example, the curation module 114 may rank all datasets of the existing ML projects 204 from the OSS ML project databases 102a-102n based on a quality of the datasets. In some embodiments, the quality of the datasets may be determined based on votes by other users (e.g., votes in Kaggle), on the basis of the datasets being part of a "featured set" of datasets hosted on the project databases (e.g., on Kaggle), or on the basis of how recent the dataset is.

The method 600 may include, at block 604, selecting a first predetermined number of the top-ranked datasets. For example, the curation module 114 may select a first predetermined number of the top-ranked datasets from the existing ML projects 204.

The method 600 may include, at block 606, for each of the selected datasets, ranking corresponding ML projects based on a significance criteria. For example, the curation module 114 may, for each of the selected datasets, rank corresponding ML projects from the existing ML projects 204 based on a significance criteria. In some embodiments, the significance of the datasets may be determined based on votes by other users (e.g., votes in Kaggle). In other embodiments, the significance of the datasets may be determined based on the accuracy of the corresponding pipeline.

The method 600 may include, at block 608, selecting a second predetermined number of the top-ranked ML projects for inclusion in the set of ML projects. For example, the curation module 114 may selecting a second predetermined number of the top-ranked ML projects from the existing ML projects 204 for inclusion in the set of the existing ML projects 204. For example, where the top 15 top-ranked ML projects are chosen for each of the top 150 datasets in Kaggle (based on upvotes by other users of Kaggle), this would yield 2,250 ML projects.

Modifications, additions, or omissions may be made to the method 600 without departing from the scope of the present disclosure. For example, the operations of method 600 may be implemented in differing order. Further, in some embodiments, the method 600 may be performed iteratively or concurrently with respect to the operations of block 502 of FIG. 5.

Figure 7:
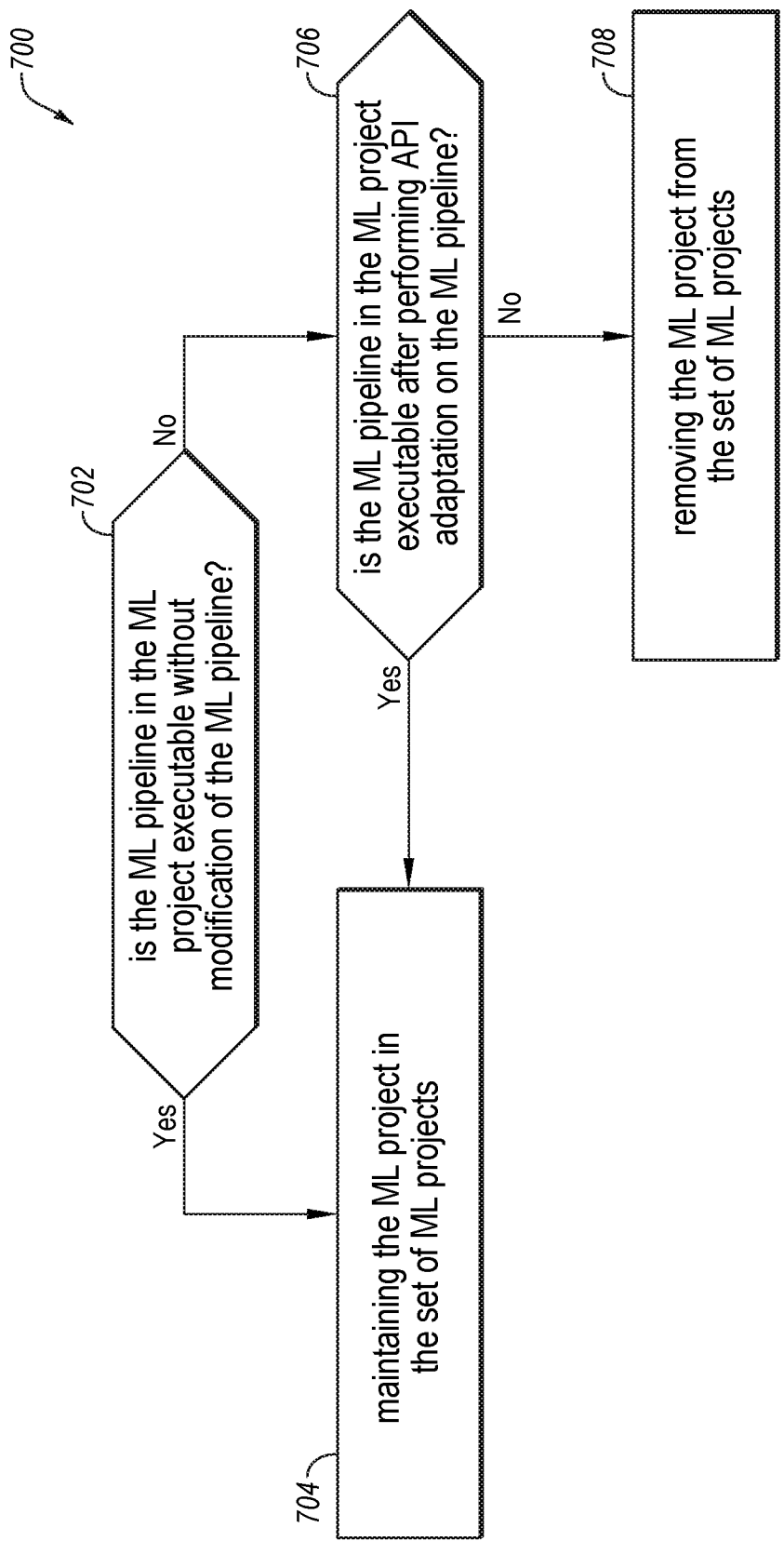
FIG. 7 is a flowchart of an example method of ensuring executability of ML pipelines in a set of ML projects.

FIG. 7 is a flowchart of an example method 700 of ensuring executability of ML pipelines in a set of ML projects, according to at least one embodiment described in the present disclosure. In some embodiments, the operation of block 504 described above with respect to the method 500 of FIG. 5 may be performed according to the method 700.

The method 700 may be performed by any suitable system, apparatus, or device. For example, the curation module 114 of FIGS. 1-2 or the computing system 402 of FIG. 4 (e.g., as directed by one or more modules) may perform one or more of the operations associated with the method 600. Although illustrated with discrete blocks, the steps and operations associated with one or more of the blocks of the method 700 may be divided into additional blocks, combined into fewer blocks, or eliminated, depending on the particular implementation.

The method 700 may include, at block 702, determining whether the ML pipeline in the ML project is executable without modification of the ML pipeline. If so (yes at block 702), the method 700 may proceed to block 704, but if not (no at block 702), the method may proceed to block 706. For example, the curation module 114 may determine whether the ML pipeline in one of the existing ML projects 204 is executable without modification.

The method may include, at block 704, maintaining the ML project in the set of ML projects. For example, the curation module 114 may maintain the ML project in the set of the existing ML projects 204 due to the ML pipeline of the ML project being executable, either before or after performing API adaptation on the ML pipeline.

The method may include, at block 706, determining whether the ML pipeline in the ML project is executable after performing API adaptation on the ML pipeline. If so (yes at block 706), the method 700 may proceed to block 704, but if not (no at block 706), the method may proceed to block 708. For example, the curation module 114 may determine whether the ML pipeline in one of the existing ML projects 204 is executable after performing API adaptation on the ML pipeline.

The method may include, at block 708, removing the ML project from the set of ML projects. For example, the curation module 114 may remove the ML project from the set of the existing ML projects 204 due to the ML pipeline of the ML project not being executable, neither before nor after performing API adaptation on the ML pipeline.

Modifications, additions, or omissions may be made to the method 700 without departing from the scope of the present disclosure. For example, the operations of method 700 may be implemented in differing order. Further, in some embodiments, the method 700 may be performed iteratively or concurrently with respect to the operations of block 504 of FIG. 5.

FIG. 8A illustrates example ML pipeline code 800 of an existing ML project, and FIG. 8B illustrates example cleaned ML pipeline code 850 resulting from the example ML pipeline code 800 of FIG. 8A having been cleaned. The ML pipeline code 800 may part of a computational notebook (e.g., a Jupyter notebook) of one of the existing ML projects 204 where the ML task is to predict whether a person earns more than $50k per year based on a dataset that includes features such as the age, work classification (workclass), education, occupation, family status, and race of multiple workers. FIGS. 8A and 8B are now discussed to provide an example of how blocks 504 and 506 of the method 500 may be performed with respect to ML pipelines in the set of the existing ML projects 204.

In the example illustrated in FIGS. 8A and 8B, the indicated API Adaptation may be performed on the ML pipeline code 800 resulting in the ML pipeline code 850 to ensure executability of the ML pipeline code 850. Further, irrelevant portions of the ML pipeline code 800, marked in bold and italic font in the ML pipeline code 850, may be identified to avoid executing this irrelevant code in certain circumstances. In some embodiments, these irrelevant portions may include debugging code, checks code, and graph plotting code.

In some embodiments, this identification of irrelevant portions of the ML pipeline code 800 may include generating a property-preserving sample $D_{sample}$ of a dataset of the ML project P<D,L>(e.g., to reduce the time involved in processing the entire dataset, but without sacrificing the range of properties of the dataset by smartly sampling the dataset), instrumenting the ML pipeline L to track variables and objects modified in each statement of the ML pipeline L, executing the instrumented ML pipeline $L^{instr}$ on the sample $D^{sample}$ of the dataset to collect an execution trace E, identifying a target statement T in the ML pipeline L (such as the target statement indicated in the ML pipeline code 850), extracting all variables and objects V from the target statement T, generating a backwards slice B of the extracted variables and objects V from the execution trace E, and annotating statements in the ML pipeline (to create an annotated ML pipeline $L^N$) from the backward slice B as relevant and all other statements in the annotated ML pipeline $L^N$ as irrelevant. In this manner, only statement in the ML pipeline code 800 that are relevant to the target statement will be annotated as relevant. In some embodiments, the smart sampling of the dataset may include one or more of using stratified sampling to retain all category values in original proportions for categorical columns, uniformly sampling across an exhibited range for continuous (numerical) columns, randomly sampling instances for String columns, and if a column has missing values in the original data, also having missing values in that column after dataset reduction. In some embodiments, this smart sampling of the dataset may result in a significant reduction of the dataset. For example, a 2 GB dataset may be reduce to 9 MB, resulting in an execution time reduced from 10 minutes to 20 seconds.

In some embodiments, the cleaning of the ML pipeline code 800, which may be part of a Jupyter notebook, may result in the cleaned ML pipeline code 850 that is more suitable for feature extraction (for project selection) and for subsequent steps of the search-and-adapt workflow (e.g., indexing of computational notebooks, search, and adaption).

Modifications, additions, or omissions may be made to the ML pipeline code 800 and the cleaned ML pipeline code 850 without departing from the scope of the present disclosure. For example, some statement of the ML pipeline code 800 may be implemented in differing order.

FIG. 9 is a table 900 of example quality features. FIG. 9 is now discussed to provide an example of how block 508 of the method 500 may be performed with respect to the set of the existing ML projects 204. In the example illustrated in FIG. 9, quality features may include performance features, code quality features, and community metrics features. These quality features that may be generated for the set of the existing ML projects 204. Each of these quality features may include measures, a metric, and a normalized metric.

In some embodiments, as disclosed in table 900 of FIG. 9, the generating of the quality features for the set of the existing ML projects 204 (e.g., at block 508 of the method 500) may include, for each ML project in the set of the existing ML projects 204, generating a numerical quality score for the ML project based on an accuracy of a trained ML model of the ML project, a documentation quality of the ML pipeline of the ML project, a modularity quality of the ML pipeline of the ML project, a standard API usage quality of the ML pipeline of the ML project, and a reputation of the ML project.

In some embodiments, the objective of extracting quality features may be to compute features that may form the basis for the selection of existing ML projects that will be placed in the ML project corpus 104. These quality features may represent the intrinsic value of the ML pipeline in terms of quality of the trained model, code structure, and value by the community. These quality features can be evaluated individually for a given ML pipeline, and may be computed as a single numerical score (e.g., between 0 and 1.0) for each ML pipeline representing its quality. In some embodiments, this single numerical score may be computed according to the following formula:

$$\text{Quality} = \frac{\sum_{i=0}^{n} u_i * f_i}{n}$$

where $f_i$ corresponds to the values for individual features as per table 900, $u_i$ corresponds to weights for each feature indicating their relative importance, and n is the total number of such features.

Modifications, additions, or omissions may be made to the table 900 without departing from the scope of the present disclosure. For example, additional quality features may be added to the quality features disclosed in the table 900.

FIG. 10 is a table 1000 of example diversity features. FIG. 10 is now discussed to provide an example of how block 510 of the method 500 may be performed with respect to the set of the existing ML projects 204. In the example illustrated in FIG. 10, diversity features may include dataset features and computational notebook features. These diversity features may be generated for the set of the existing ML projects 204. Each of these diversity features may include an intent, a metric, and a normalization.

In some embodiments, as disclosed in the table 1000, the generating of the diversity features for the set of the existing ML projects 204 (e.g., at block 510 of the method 500) may include, for each ML project in the set of the existing ML projects 204, extracting a feature vector for the ML project based on a size of a dataset of the ML project, a presence or absence of missing values in the dataset of the ML project, types of data in the dataset of the ML project, presence or absence of predetermined library APIs in the ML pipeline of the ML project, and relative ranges of constituent data streams in the dataset of the ML project.

In some embodiments, the objective of extracting diversity features may be to compute features that may form the basis for the selection of existing ML projects that will be placed in the ML project corpus 104. These diversity features may capture the ability of the ML pipeline to add to the variety of solutions ultimately available in the ML project corpus 104. These diversity features may be evaluated with respect to other ML pipelines being selected, and may be computed as a feature vector for each ML project representing its contribution to diversity.

Modifications, additions, or omissions may be made to the table 1000 without departing from the scope of the present disclosure. For example, additional diversity features may be added to the diversity features disclosed in the table 1000.

Figure 11:
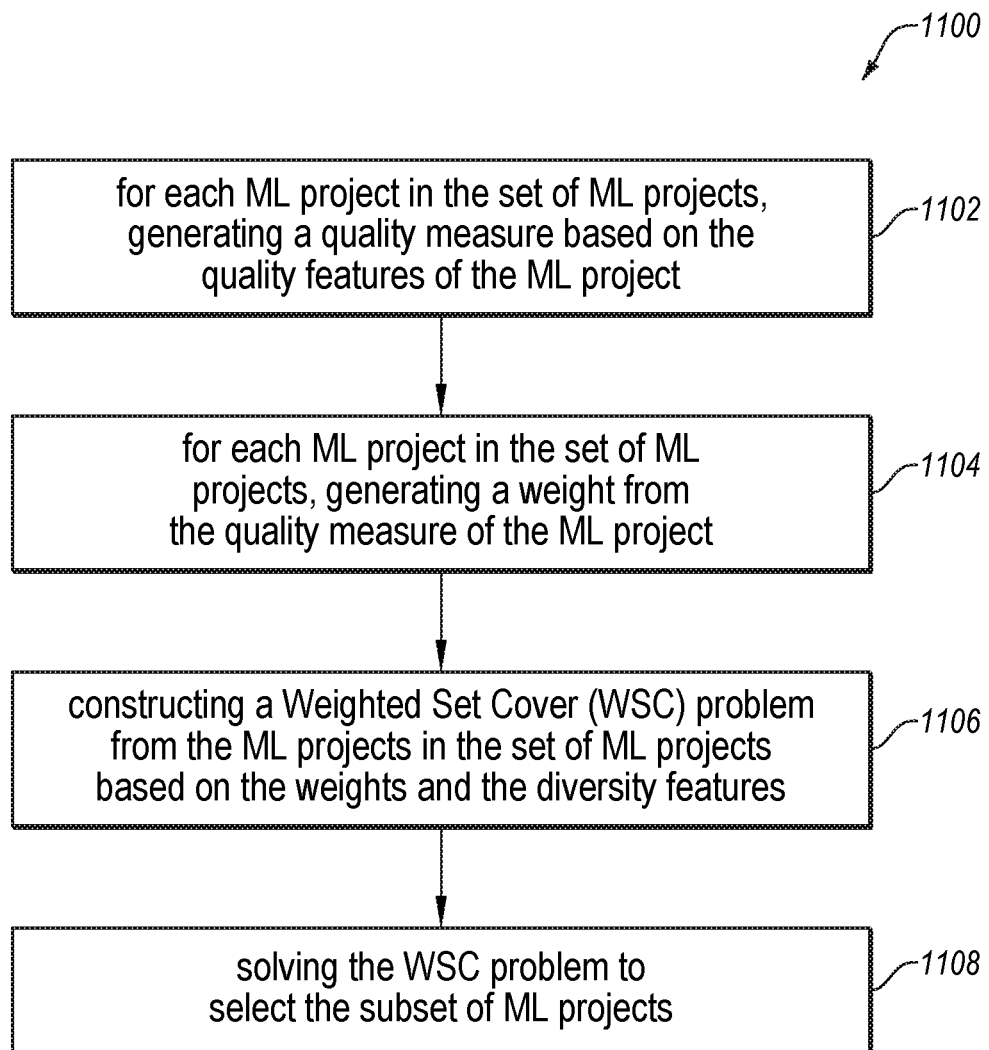
FIG. 11 is a flowchart of an example method of selecting a subset of ML projects from a set of ML projects based on quality features and diversity features.

FIG. 11 is a flowchart of an example method 1100 of selecting a subset of ML projects from a set of ML projects based on quality features and diversity features, according to at least one embodiment described in the present disclosure. In some embodiments, the operation of block 512 described above with respect to the method 500 of FIG. 5 may be performed according to the method 1100.

The method 1100 may be performed by any suitable system, apparatus, or device. For example, the curation module 114 of FIGS. 1-2 or the computing system 402 of FIG. 4 (e.g., as directed by one or more modules) may perform one or more of the operations associated with the method 600. Although illustrated with discrete blocks, the steps and operations associated with one or more of the blocks of the method 1100 may be divided into additional blocks, combined into fewer blocks, or eliminated, depending on the particular implementation.

The method 1100 may include, at block 1102, for each ML project in the set of ML projects, generating a quality measure based on the quality features of the ML project. For example, the curation module 114 may, for each ML project in the set of the existing ML projects 204, generate a quality measure based on the quality features of the ML project. For example, given a set of cleaned ML projects: $P=\{P_1, P_2, \ldots, P_m\}$ which collectively exhibit features drawn from a universe: $U=\{f_1, f_2, \ldots, f_n\}$, each ML project $P_i$ may have a quality $q_i$ and includes a set of features $F_i=\{f_1, f_2, f_{n_i}\}$.

The method 1100 may include, at block 1104, for each ML project in the set of ML projects, generating a weight from the quality measure of the ML project. For example, the curation module 114 may, for each ML project in the set of the existing ML projects 204, generate a weight from the quality measure of the ML project. For example, for each project $P_i$ its weight $w_i=W-q_i$, where $W=2*\max_{P_i \in P}(q_i)$.

The method 1100 may include, at block 1106, constructing a Weighted Set Cover (WSC) problem from the ML projects in the set of ML projects based on the weights and the diversity features. For example, the curation module 114 may construct a WSC problem from the ML projects in the set of the existing ML projects 204 based on the weights and the diversity features. Computing the weights from the quality measures of each ML pipeline may allow formulating the original task of selecting a set of pipelines that maximizes collective quality of the selected pipelines (i.e., a maximization goal), as the problem of selecting a set of pipelines with minimal weight (i.e., a minimization goal) that may be naturally solvable as a WSC problem. Further, making the weights larger with regard to the quality values (by choice of W) incentivizes minimizing the cardinality of the selected set. Since WSC is an NP-Complete problem, any of the well-known approximation algorithms for WSC may be used to solve the above. Two possibilities include a greedy algorithm or an algorithm based on Linear Programming (LP) relaxation.

The method 1100 may include, at block 1108, solving the WSC problem to select the subset of ML projects. For example, the curation module 114 may solve the WSC problem to select the subset of the existing ML projects 204. Solving the WSC problem may solve for the subset of minimum weight, and doing so may indirectly maximize the aggregate quality of the chosen pipelines. For example, the goal may be to select a subset $S \subseteq P$ which together exhibit all features in U, i.e., $\cup_{P_j \in S} F_j = U$ and which maximizes the collective quality of the selected projects S, i.e., maximizes $Q_S = \Sigma_{P_j \in S} q_j$. In some embodiments, this may involve the ideal of selecting a minimal number of ML projects.

Modifications, additions, or omissions may be made to the method 1100 without departing from the scope of the present disclosure. For example, the operations of method 1100 may be implemented in differing order. Further, in some embodiments, the method 1100 may be performed iteratively or concurrently with respect to the operations of block 512 of FIG. 5.

Figure 12:
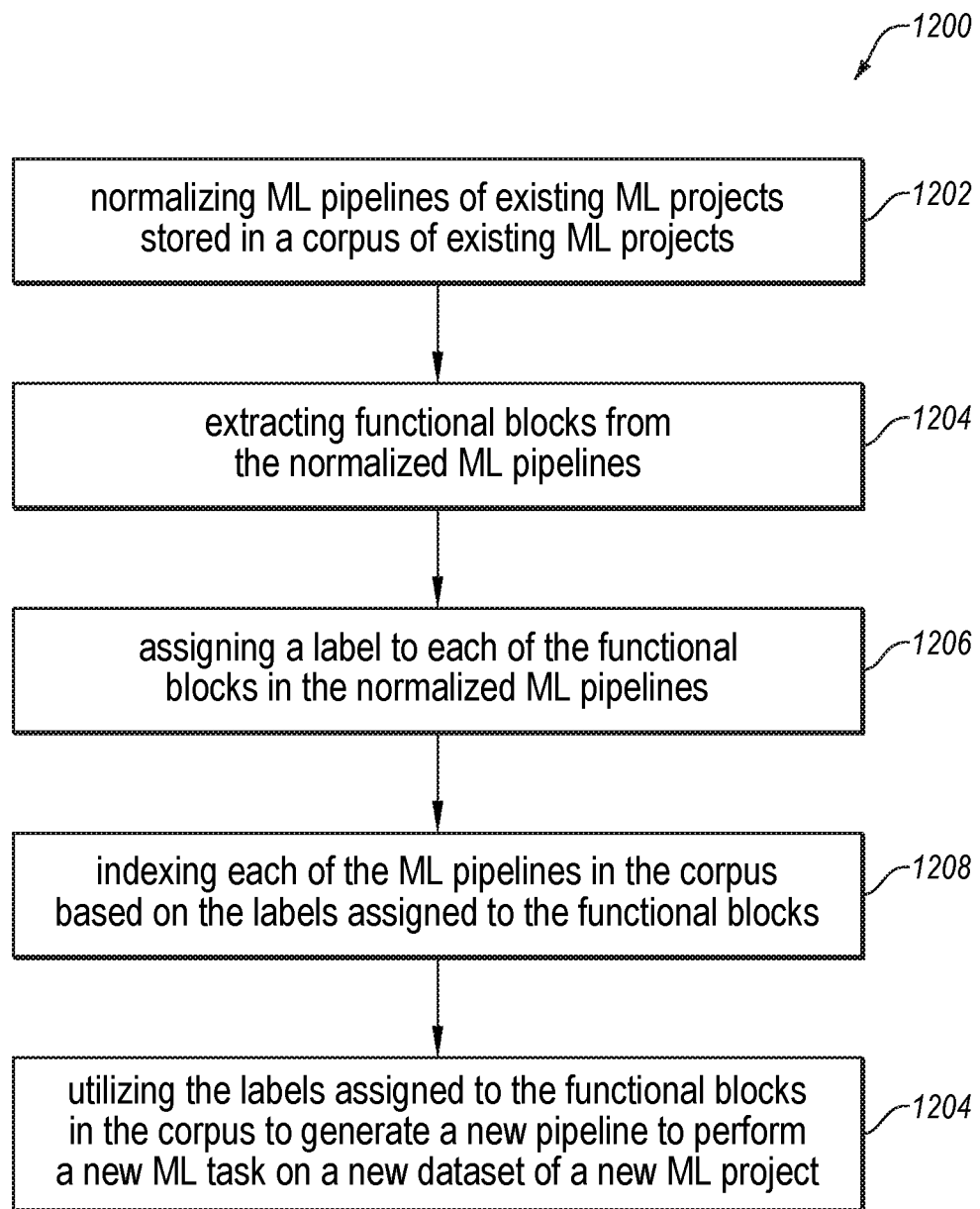
FIG. 12 is a flowchart of an example method of automatically labeling functional blocks in pipelines of existing ML projects in a corpus adaptable for use in new ML projects.

FIG. 12 is a flowchart of an example method 1200 of automatically labeling functional blocks in pipelines of existing ML projects in a corpus adaptable for use in new ML projects, according to at least one embodiment described in the present disclosure. The method 1200 may be performed by any suitable system, apparatus, or device. For example, the curation module 114 of FIGS. 1-2 or the computing system 402 of FIG. 4 (e.g., as directed by one or more modules) may perform one or more of the operations associated with the method 1200. Although illustrated with discrete blocks, the steps and operations associated with one or more of the blocks of the method 1200 may be divided into additional blocks, combined into fewer blocks, or eliminated, depending on the particular implementation.

In some embodiments, the method 1200 may be employed by the curation module 114 to abstract 210 and create project artifacts 212 on the existing ML projects 204, prior to storing a subset of the existing ML projects 204 in the ML project corpus 104, as illustrated in FIG. 2.

The method 1200 may include, at block 1202, normalizing ML pipelines of existing ML projects stored in a corpus of existing ML projects. For example, the curation module 114 may normalize ML pipelines of a subset of the existing ML projects 204 (potentially after the existing ML projects 204 have been filtered 206 and cleaned 208) that are stored in the ML projects corpus 104. In some embodiments, the ML pipelines may be normalized as illustrated in the original ML pipeline code 1300 and the normalized ML pipeline code 1350 of FIGS. 13A and 13B as described in further detail below.

The method 1200 may include, at block 1204, extracting functional blocks from the normalized ML pipelines. For example, the curation module 114 may extract functional blocks from the normalized ML pipelines. In some embodiments, the functional blocks may be extracted according to one or more operations of the method 1400 described in further detail below with respect to FIG. 14.

The method 1200 may include, at block 1206, assigning a label to each of the functional blocks in the normalized ML pipelines. For example, the curation module 114 may assign a label to each of the functional blocks in the normalized ML pipelines. In some embodiments, the labels may be assigned according to one or more operations of the method 1600 described in further detail below with respect to FIG. 16.

The method 1200 may include, at block 1208, indexing each of the ML pipelines in the corpus based on the labels assigned to the functional blocks. For example, the curation module 114 may index each of the ML pipelines in the ML project corpus 104 based on the labels assigned to the functional blocks.

The method 1200 may include, at block 1210, utilizing the labels assigned to the functional blocks in the corpus to generate a new pipeline to perform a new ML task on a new dataset of a new ML project. For example, the search module 116 and the adaptation module 120 may utilize the labels assigned to the functional blocks in the ML project corpus 104 to generate the new ML pipeline 112 to perform the new ML task 108 on the new dataset 106 of the new ML project 310.

Modifications, additions, or omissions may be made to the method 1200 without departing from the scope of the present disclosure. For example some of the operations of method 1200 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the disclosed embodiments.

FIG. 13A illustrates example original ML pipeline code 1300 of an existing ML project before normalization, and FIG. 13B illustrates example normalized ML pipeline code 1350 after normalization of the original ML pipeline code 1300. The original ML pipeline code 1300 may part of a computational notebook (e.g., a Jupyter notebook) of one of the existing ML projects 204 where the ML task is to predict whether a person earns more than $50k per year based on a dataset that includes features such as the age, work classification (workclass), education, occupation, family status, and race of multiple workers. FIGS. 13A and 13B are now discussed to provide an example of how block 1202 of the method 1200 may be performed with respect to ML pipelines in the set of the existing ML projects 204.

In the example illustrated in FIGS. 13A and 13B, the original ML pipeline code 1300 may be normalized in various way, including one or more of normalizing variable names, replacing column names with column data types, removing parameters from API statements, and collapsing repeated instance of an API statement into a single instance of the API statement. For example, the variable names "dataset", "array", "X", "Y", "X_train", "X_validation", "Y_train", "Y_validation", "random_forest", and "predictions" in the original ML pipeline code 1300 may each be normalized to "_var_" in the normalized ML pipeline code 1350. Also, the columns "workclass", "occupation", "native.country", and "sex" in the original ML pipeline code 1300 may each be normalized to "_str_category_" in the normalized ML pipeline code 1350. Further, each of the parameters of the API statements "filna", "map", "train_test_split", "RandomForestClassifier", "fit", and "predict" (e.g., parameters such as "X", "United-States", "Male", "0", "Female", "1", etc.) in the original ML pipeline code 1300 may each be normalized by removing the parameters in the normalized ML pipeline code 1350. Also, the three repeated API statements "yar_["_str_category_"]=_var_r_str_category_1fillna( )" in the original ML pipeline code 1300 may be collapsed into a single instance of the API statement, as disclosed by the "x3" label in the normalized ML pipeline code 1500 of FIG. 15).

Modifications, additions, or omissions may be made to the original ML pipeline code 1300 and the normalized ML pipeline code 1350 without departing from the scope of the present disclosure. For example, some statement of the original ML pipeline code 1300 may be implemented in differing order, and other normalizations may be performed on the original ML pipeline code 1300.

Figure 14:
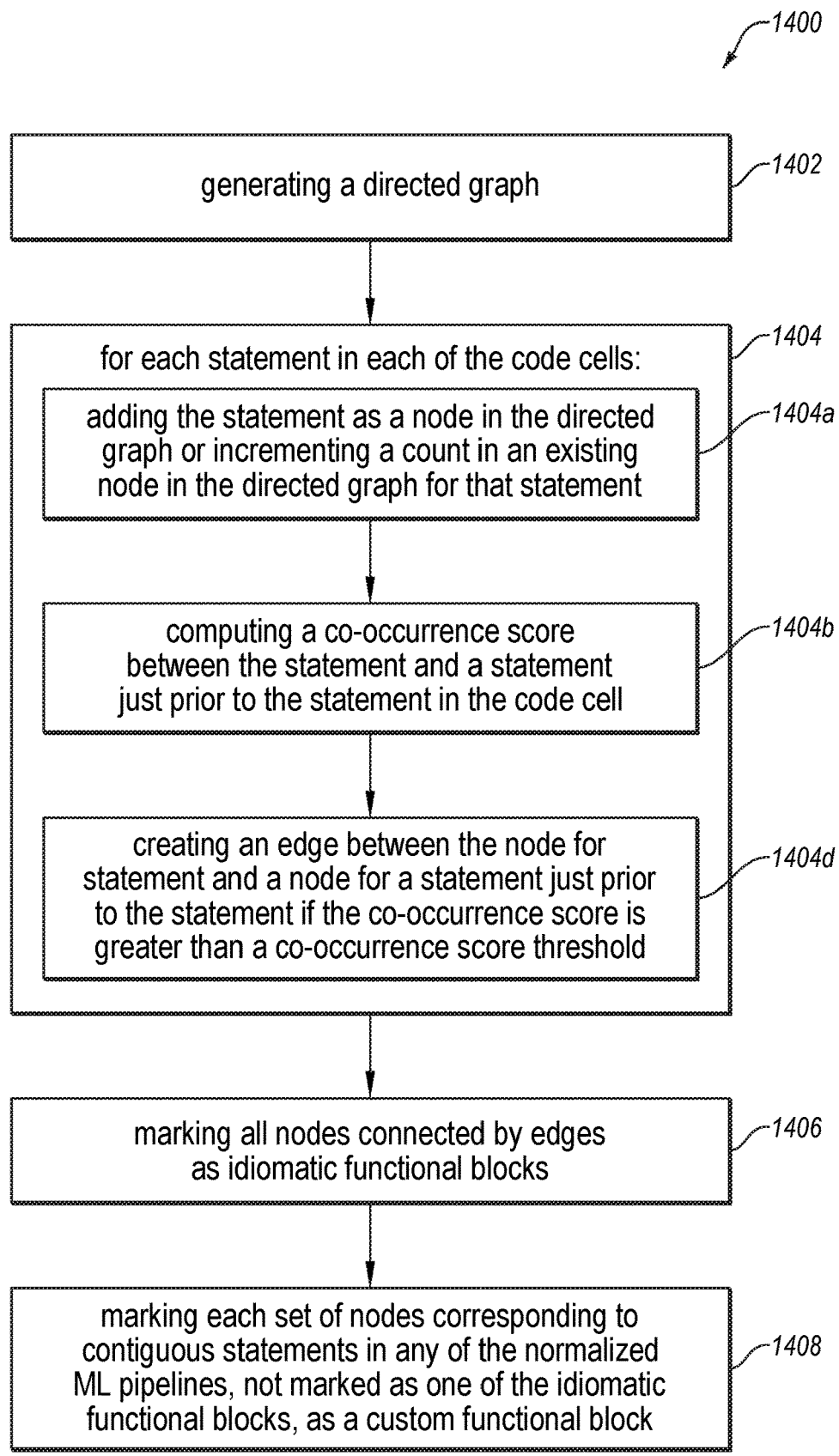
FIG. 14 is a flowchart of an example method of identifying idiomatic functional blocks and custom functional blocks.

FIG. 14 is a flowchart of an example method 1400 of identifying idiomatic functional blocks and custom functional blocks, according to at least one embodiment described in the present disclosure. In some embodiments, the operations of block 1204 described above with respect to the method 1200 of FIG. 12 may be performed according to the method 1400.

The method 1400 may be performed by any suitable system, apparatus, or device. For example, the curation module 114 of FIGS. 1-2 or the computing system 402 of FIG. 4 (e.g., as directed by one or more modules) may perform one or more of the operations associated with the method 1400. Although illustrated with discrete blocks, the steps and operations associated with one or more of the blocks of the method 1400 may be divided into additional blocks, combined into fewer blocks, or eliminated, depending on the particular implementation.

In some embodiments, the method 1400 may be employed to split each ML pipeline of each of the existing ML projects stored in the ML project corpus 104 into code cells. In some embodiments, computational notebooks (e.g., Jupyter notebooks) are naturally structured such that all the code in the computational notebook is organized into a set of code cells, each of which may initially be assumed to be a distinct functional block, although this initial assumption may be overridden after additional analysis. The method 1400 may then be employed to identify repeating groups of statements across the code cells as idiomatic functional blocks, and to identify all other groups of statements in the code cells as custom functional blocks.

The method 1400 may include, at block 1402, generating a directed graph. For example, the curation module 114 may generate a directed graph (see e.g., the directed graphs illustrated in FIG. 15). In some embodiments, each node in the directed graph may represent a normalized statement with their occurrences in the ML project corpus 104, and each edge may represent an average probability score of the co-occurrence of the statements corresponding to the two nodes that the edge connects. There may be no connection between the last statement of one cell and the first statement of the next cell. For example, given two node A and B, the value of their edge may be expressed as:

$$\text{edge}_{value} = \frac{p(B|A \text{ as source}) + p(A|B \text{ as sink})}{2}$$

The method 1400 may include, at block 1404, for each statement in each of the code cells, at block 1404a, adding the statement as a node in the directed graph or incrementing a count in an existing node in the directed graph for that statement, at block 1404b, computing a co-occurrence score between the statement and a statement just prior to the statement in the code cell, and at block 1404c, creating an edge between the node for statement and a node for a statement just prior to the statement if the co-occurrence score is greater than a co-occurrence score threshold. For example, for each statement in each of the code cells (e.g., each code cell in a computational notebook such as a Jupyter notebook), the curation module 114 may add the statement as a node in the directed graph or increment a count in an existing node in the directed graph for that statement (see e.g., the nodes of the directed graphs illustrated in FIG. 15 with counts inside each node), compute a co-occurrence score between the statement and a statement just prior to the statement in the code cell (see e.g., the co-occurrence scores in the multi-line idioms directed graph illustrated in FIG. 15), and create an edge between the node for statement and a node for a statement just prior to the statement if the co-occurrence score is greater than a co-occurrence score threshold (see e.g., the edges between nodes in the multi-line idioms directed graph illustrated in FIG. 15). In some embodiments, this creation of edges may alternatively be performed by initially creating all edges without regard to co-occurrence scores, but then removing all the edges that have a co-occurrence score smaller than a specified threshold value. The threshold value may be determined empirically. After the edge removal, a set of connected components may remain where each component represents an idiom (e.g., a set of statements/API that occur together to implement a functionality).

The method 1400 may include, at block 1406, marking all nodes connected by edges as idiomatic functional blocks. For example, the curation module 114 may mark all nodes connected by edges as idiomatic functional blocks (see e.g., the nodes connected by edges in the multi-line idioms directed graph illustrated in FIG. 15).

The method 1400 may include, at block 1408, marking each set of nodes corresponding to contiguous statements in any of the normalized ML pipelines, not marked as one of the idiomatic functional blocks, as a custom functional block. For example, the curation module 114 may mark each set of nodes corresponding to contiguous statements in any of the normalized ML pipelines, not marked as one of the idiomatic functional blocks, as a custom functional block (see e.g., the single-line functional blocks and multi-line functional blocks illustrated in FIG. 15).

Modifications, additions, or omissions may be made to the method 1400 without departing from the scope of the present disclosure. For example, the operations of method 1400 may be implemented in differing order. Further, in some embodiments, the method 1400 may be performed iteratively or concurrently with respect to the operations of block 1204 of FIG. 12.

FIG. 15 illustrates extracting functional blocks from a normalized ML pipeline using directed graphs. FIG. 15 is now discussed to provide an example of how block 1204 of the method 1200 and the blocks 1402-1408 of the method 1400 may be performed with respect to normalized ML pipeline code 1500. In the example illustrated in FIG. 15, the normalized ML pipeline code 1500 may be used to generated one or more directed graphs, with each node representing a statement, and with each edge representing co-occurrences between statements with a score above a threshold. As disclosed in the single-line functional blocks, there are 94 occurrences of statement 1, 6 occurrences of statement 2, and 6 occurrences of statement 3 across all normalized ML pipelines. Further, as disclosed in the multi-line functional blocks, there is only a single occurrences of the statements 4, 5, 6, and 7, which indicates that these statement only appears in the normalized ML pipeline code 1500, but do not appear in any other normalized ML pipeline. Also, as disclosed in the multi-line idioms, there are 10 occurrences of statement 8, 10 occurrences of statement 9, 8 occurrences of statement 10, and 2 occurrences of statement 11. The edges, with their corresponding co-occurrence scores each above a threshold score (e.g., a threshold of 0.5), indicate that the statement sequences 8, 9, 10, and 8, 9, 11 appear together in multiple normalized ML pipelines, and should therefore be together marked as an idiomatic functional block in each normalized ML pipelines in which they appear. Further, after marking the idiom 8, 9, 10 as an idiomatic functional block in normalized ML pipeline code 1500, the remaining statements in normalized ML pipeline code 1500 can be resolved into single line functional blocks 1, 2, and 3 and the multi-line custom functional block comprised of statements 4, 5, 6, and 7, by virtue of the boundaries of the code cells they lie within.

Modifications, additions, or omissions may be made to the normalized ML pipeline code 1500 and the directed graphs of FIG. 15 without departing from the scope of the present disclosure. For example, additional directed graphs for additional normalized ML pipeline code may be added.

Figure 16:
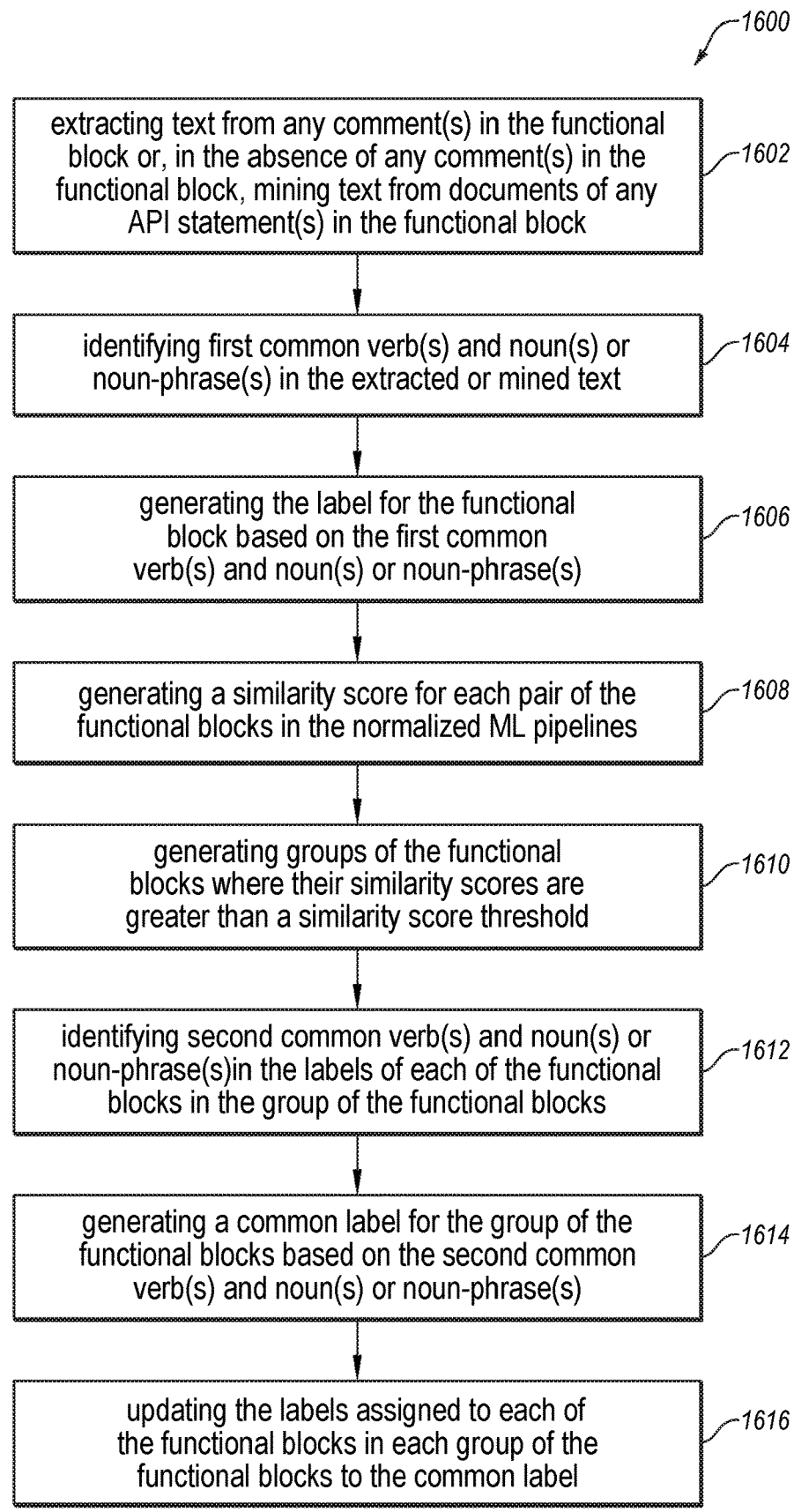
FIG. 16 is a flowchart of an example method of assigning a label to each of the functional blocks in normalized ML pipelines.

FIG. 16 is a flowchart of an example method 1600 of assigning a label to each of the functional blocks in normalized ML pipelines. In some embodiments, the operations of block 1206 described above with respect to the method 1200 of FIG. 12 may be performed according to the method 1600.

The method 1600 may be performed by any suitable system, apparatus, or device. For example, the curation module 114 of FIGS. 1-2 or the computing system 402 of FIG. 4 (e.g., as directed by one or more modules) may perform one or more of the operations associated with the method 1600. Although illustrated with discrete blocks, the steps and operations associated with one or more of the blocks of the method 1600 may be divided into additional blocks, combined into fewer blocks, or eliminated, depending on the particular implementation.

The method 1600 may include, at block 1602, extracting text from any comment(s) in the functional block or, in the absence of any comment(s) in the functional block, mining text from documents of any API statement(s) in the functional block. For example, the curation module 114 may extracting text from any comment(s) in the functional block (e.g., the statement beginning with a "W' before each functional block in the normalized ML pipeline code 1500) or, in the absence of any comment(s) in the functional block, mining text from documents of any API statement(s) in the functional block (e.g., documentation of the API statement that can be obtained at a repository of the API code, such as on a website that hosts the API code). This extracting or mining may additionally or alternatively involve pre-processing the extracted or mined text, such as by apply standard preprocessing techniques (e.g., removing stopwords, stemming, tokenizing, etc.).

The method 1600 may include, at block 1604, identifying first common verb(s) and noun(s) or noun-phrase(s) in the extracted or mined text. For example, the curation module 114 may identify common verb(s) (e.g., "scale" or "apply") and noun(s) or noun-phrase(s) (e.g., "data" or "standard" or "unit variance") in the extracted or mined text. In the context of the method 1600, the term "common" may refer to verbs, nouns, or noun phrases that are common across multiple instances of an idiomatic functional blocks, or that are common across labels. In some embodiments, block 1604 may involve extracting the noun/verb candidates for each instance of an idiomatic functional block from the extracted or mined text that could potentially form the label for all instances of the idiomatic block.

The method 1600 may include, at block 1606, generating the label for the functional block based on the first common verb(s) and noun(s) or noun-phrase(s). For example, the curation module 114 may generate a label "scale date" from a comment "scale the data to be between −1 and 1". In some embodiments, this generating of the label may include taking the most important verb(s) and noun(s) or noun-phrase(s) to assign these words as a semantic label for the functional block, and for other instances of the same idiomatic functional block. In these embodiments, the most important words may be determined as the top N frequently used words, or may be determined through topic modelling, or may be determined in some other way. In some embodiments, block 1606 may involve taking a consensus operation among the label candidates contributed by each instance of an idiomatic functional block and finding the most important and common noun/verb instances across these different candidates. This may form the initial label for all instances of the idiomatic functional block. For example, four labels "scale data", "apply standard", "scale numerical column data", and "standard feature remove mean scale unit variance" that are from idiomatic functional blocks may be relabeled with a single common label "scale standard data".

In some embodiments, blocks 1604 and 1606 may be performed for idiomatic functional blocks, but may be modified for custom functional blocks. In these embodiments, blocks 1604 and 1606 may be modified for each custom functional block by taking the most important nouns and verbs from extracted or mined text of the custom functional block to provide a starting point for block 1608, rather than performing a consensus operation.

The method 1600 may include, at block 1608, generating a similarity score for each pair of the functional blocks in the normalized ML pipelines. For example, the curation module 114 may generate a similarity score (e.g., a score between 0 and 1.0) for each pair of the functional blocks in the normalized ML pipelines. In some embodiments, the similarity score can be computed though simple word matching. For example, for two labels having word-set A and B, the similarly score may be computed as follows:

$$\text{similarityScore} = \frac{2*|A \cap B|}{|A|+|B|}$$

The method 1600 may include, at block 1610, generating groups of the functional blocks where their similarity scores are greater than a similarity score threshold. For example, the curation module 114 may generate groups of the functional blocks where their similarity scores are greater than a similarity score threshold (e.g., a threshold of 0.5). In some embodiments, for a given functional block, other functional blocks may be sorted based on the similarity score based on the semantic labels and the top K may be marked as different implementations of the same functionality. In some embodiments, the similarity score threshold may be tuned empirically.

The method 1600 may include, at block 1612, identifying second common verb(s) and noun(s) or noun-phrase(s) in the labels of each of the functional blocks in the group of the functional blocks. For example, the curation module 114 may identify second common verb(s) (e.g., "scale") and noun(s) or noun-phrase(s) (e.g., "data") of each of the functional blocks in the group of the functional blocks. This second identification may enable a second iteration after the first round of labels are created to further consolidate groups of functional blocks with sufficiently similar labels to be considered functionally equivalent.

The method 1600 may include, at block 1614, generating a common label for the group of the functional blocks based on the second common verb(s) and noun(s) or noun-phrase(s). For example, the curation module 114 may generate a common label from the second common verb(s) and noun(s) or noun-phrase(s). In some embodiments, the common or frequent words of the semantic labels may be assigned as a common semantic label for the whole group. For example, the curation module 114 may update labels assigned to each of the functional blocks in each group of the functional blocks to the common label. For example, two labels "scale standard data" and "scale data feature" that are from functional blocks determined to be functionally equivalent may be relabeled with a single common label "scale data".

The method 1600 may include, at block 1616, updating the labels assigned to each of the functional blocks in each group of the functional blocks to the common label.

Modifications, additions, or omissions may be made to the method 1600 without departing from the scope of the present disclosure. For example, the operations of method 1600 may be implemented in differing order. Further, in some embodiments, the method 1600 may be performed iteratively or concurrently with respect to the operations of block 1206 of FIG. 12.

FIG. 17 illustrates automatic labeling of functional block in ML pipelines. FIG. 17 is now discussed to provide an example of how various blocks of the method 1600 may be performed. In the example illustrated in FIG. 17, a functional block, block-1, may include two normalized statements, namely, "_var_=StandardScaler( )" and "_var1_=_var_lit_transform( )" This functional block may be an idiomatic functional block because it appears in four separate computational notebooks, namely, notebook-1, notebook-2, notebook-3, and notebook-4. Further, a second function block, block-2, may include two normalized statements, namely, "_var_=MinMaxScaler( )" and "_var1_=_var_lit_transform( )" Although these two functional blocks are not identical, they may be determined to be functionally equivalent based on similarities between their assigned labels, as discussed below.

With respect to block-1, at block 1602 of the method 1600, text may be extracted from comments for notebook-1, notebook-2, and notebook-3, but no comment may be available for notebook-4. Therefore, text may be mined from an alternative source (e.g., API documentation) for notebook-4. Then, at block 1604 of the method 1600, common verbs (e.g., "scale" or "apply") and nouns or noun phrases (e.g., "data" or "standard" or "unit variance") may be identified from the extracted or mined text. Next, at block 1606 of the method 1600, the label "scale standard data" may be generated for block-1 based on the first common verbs and noun or noun phrases. Similarly for block-2, at block 1602, and at modified versions of blocks 1604 and 1606 (as discussed above), the label "scale data feature" may be generated.

At block 1608 of the method 1600, a similarity score of 0.67 may be generated for the pair of block-1 and block 2. At block 1610 of the method 1600, block-1 and block-2 may be grouped together because their similarity score (0.67) is greater than a similarity score threshold (e.g., a threshold of 0.60). At block 1612 of the method 1600, a common verb (e.g., "scale") and noun (e.g., "data") may be identified in the labels of block-1 and block 2. The method 1600 may include, at block 1614, generating a common label ("scale data") for block-1 and block 2 based on the common verb (e.g., "scale") and noun (e.g., "data").

Modifications, additions, or omissions may be made to the functional blocks, extracted or mined text, similarity score, and automatically assigned labels without departing from the scope of the present disclosure.

Figure 18:
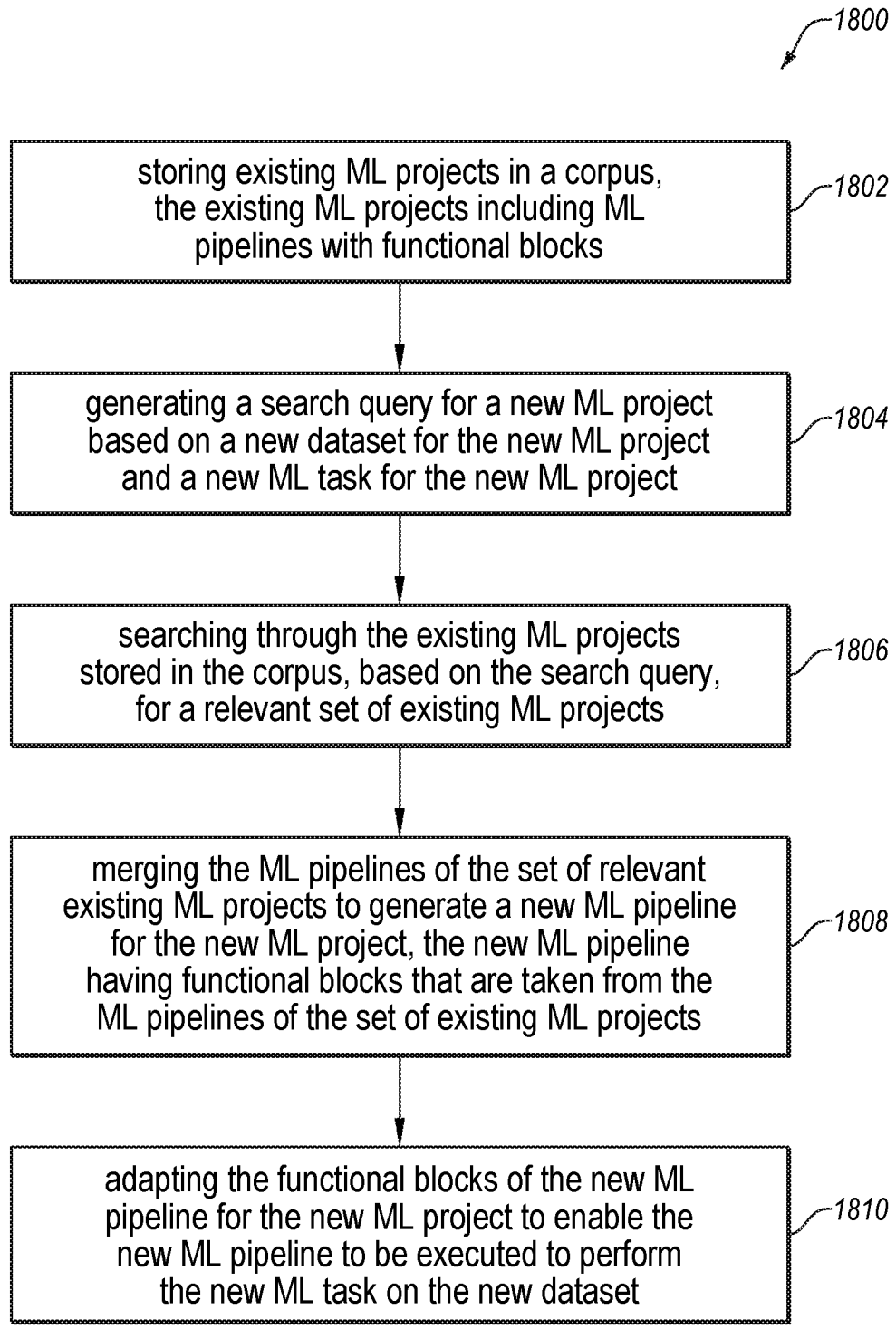
FIG. 18 is a flowchart of an example method of automatically generating a pipeline of a new ML project from pipelines of existing ML projects stored in a corpus.

FIG. 18 is a flowchart of an example method 1800 of automatically generating a pipeline of a new ML project from pipelines of existing ML projects stored in a corpus, according to at least one embodiment described in the present disclosure. The method 1800 may be performed by any suitable system, apparatus, or device. For example, the curation module 114, the search module 116, and the adaptation module 120 of FIGS. 1-3 or the computing system 402 of FIG. 4 (e.g., as directed by one or more modules) may perform one or more of the operations associated with the method 1800. Although illustrated with discrete blocks, the steps and operations associated with one or more of the blocks of the method 1800 may be divided into additional blocks, combined into fewer blocks, or eliminated, depending on the particular implementation.

In some embodiments, the method 1800 may be employed by the curation module 114, the search module 116, and the adaptation module 120 to perform the operations disclosed in FIGS. 1 and 2.

The method 1800 may include, at block 1802, storing existing ML projects in a corpus, the existing ML projects including ML pipelines with functional blocks. For example, the curation module 114 may store the existing ML projects 204 in the ML project corpus 104. In some embodiments, the existing ML projects 204 may include ML pipelines with functional blocks. In some embodiments, these functional blocks may be identified according to the operations of block 1204 of the method 1200.

The method 1800 may include, at block 1804, generating a search query for a new ML project based on a new dataset for the new ML project and a new ML task for the new ML project. For example, the search module 116 may generate the query 306 from the new ML project 310 based on the new dataset 106 for the new ML project 310 and the new ML task 108 for the new ML project 310.

The method 1800 may include, at block 1806, searching through the existing ML projects stored in the corpus, based on the search query, for a set of relevant existing ML projects. For example, the search module 116 may search through the existing ML projects stored in the ML project corpus 104, based on the query 306, for the relevant existing ML projects 110.

The method 1800 may include, at block 1808, merging the ML pipelines of the set of relevant existing ML projects to generate a new ML pipeline for the new ML project, the new ML pipeline having functional blocks that are taken from the ML pipelines of the set of relevant existing ML projects. For example, the adaptation module 120 may perform a pipeline merge 308 of the ML pipelines 111 of the relevant existing ML projects 110 to generate the new ML pipeline 112 for the new ML project 310. In this example, the new ML pipeline 112 may have functional blocks that are taken from the ML pipelines 111 of the relevant existing ML projects 110.

The method 1800 may include, at block 1810, adapting the functional blocks of the new ML pipeline for the new ML project to enable the new ML pipeline to be executed to perform the new ML task on the new dataset. For example, the adaptation module 120 may adapt the functional blocks of the new ML pipeline 112 for the new ML project 310 to enable the new ML pipeline 112 to be executed to perform the new ML task 108 on the new dataset 106.

Modifications, additions, or omissions may be made to the method 1800 without departing from the scope of the present disclosure. For example some of the operations of method 1800 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the disclosed embodiments.

Figure 19:
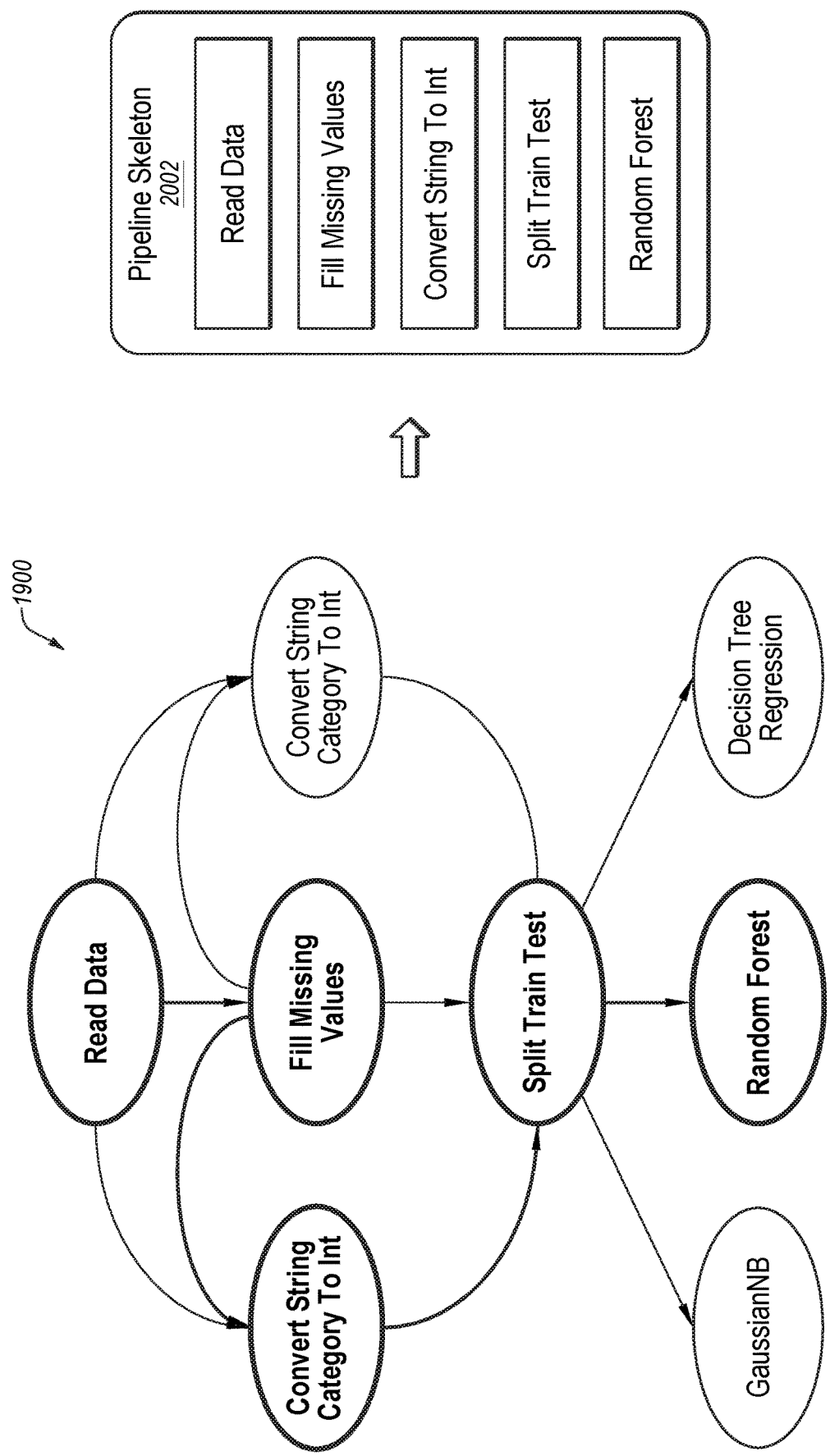
FIG. 19 illustrates a sequence graph and a pipeline skeleton for a new ML project.
Figure 20:
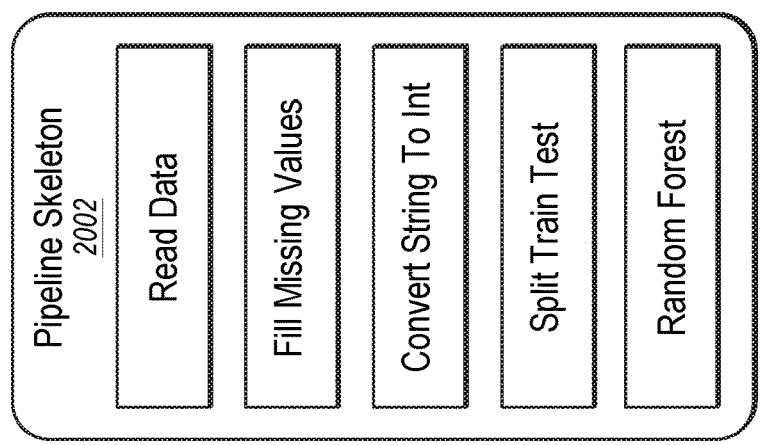
FIG. 20 illustrates the pipeline skeleton of FIG. 19 and a table of ML pipelines that may be searched for functional blocks that match the pipeline skeleton.

FIG. 19 illustrates a sequence graph 1900 and a pipeline skeleton 2002 for a new ML project (e.g., the new ML project 1310), and FIG. 20 illustrates the pipeline skeleton 2002 and a table 2050 of ML pipelines that may be searched for functional blocks that match the pipeline skeleton 2002. FIGS. 19 and 20 are now discussed to provide an example of how blocks 1804, 1806, 1808, 1810 of the method 1800 may be performed with respect to the ML project corpus 104.

As disclosed in FIGS. 19 and 20, the pipeline skeleton 2002 may be an ordered set of functional blocks for the new ML pipeline 112 of the new ML project 310, which may correspond to labels assigned to functional blocks of the ML pipelines of the existing ML projects stored in the ML project corpus 104. In some embodiments, the pipeline skeleton 2002 may be generated by the pipeline skeleton ML model 302. The pipeline skeleton ML model 302 (or a set of ML models) may be trained to learn the mapping between dataset meta-feature and semantic labels. For example, given the meta-features of the new dataset 106, The pipeline skeleton ML model 302 may be trained synthesize the pipeline skeleton 2002 that contains the required semantic labels with their sequence.

In some embodiments, the pipeline skeleton ML model 302 may include a multivariate multi-valued classifier that is trained prior to generating the pipeline skeleton 2002. The multivariate multi-valued classifier may be configured to map the dataset meta-features into an unordered set of functional blocks (denoted by corresponding semantic labels) that the pipeline skeleton 304 or 2002 should contain. This training may include extracting dataset features from datasets of the existing ML projects in the ML project corpus 104 correlated to particular labels, identifying a set of all labels from the functional blocks of the existing ML projects, preparing training data comprising an input vector having the dataset features and a binary output tuple that denotes a presence or absence of each of the set of all labels, and training the pipeline skeleton ML model 302 to learn mappings between the dataset features and corresponding labels of the set of all labels. In some embodiments, the training of the pipeline skeleton ML model 302 may enable the pipeline skeleton ML model 302 to use salient properties of the new dataset 106 and the new ML task 108 (meta-features) to predict an ordered set of functional blocks (e.g., in the pipeline skeleton 304 or 2002) that can constitute an ML pipeline for the new ML pipeline 112. Meta-features of a dataset may include, but are not limited to, a number of rows, a number of features, a presence of number, a presence of missing values, a presence of numbers, a presence of a number category, a presence of a string category, a presence of text, and a type of target.

In some embodiments, the pipeline skeleton ML model 302 may further include a sequence graph (e.g., similar to the sequence graph 1900) representing a partial order among functional blocks learned from the training data. The sequence graph may be configured to map the unordered set of blocks into an ordered set (e.g., as illustrated in the pipeline skeleton 2002) based on a partial order among blocks learned from the training project corpus. The sequence graph may include a node for each label of the set of all labels from the functional blocks of the existing ML projects. The sequence graph may also include a directed edge between each pair of a first node and a second node where the first node precedes the second node in one of the existing ML projects.

Once the pipeline skeleton ML model 302 is trained, the pipeline skeleton ML model 302 may be employed to generate the query 306 for the new ML project 310. In some embodiments, this generation of the query 306 may include mapping the dataset features into an unordered set of labels for the new ML pipeline 112 of the new ML project 310, and may also include mapping the unordered set of labels into an ordered sequence of labels, using the partial order represented in the sequence graph (e.g., the sequence graph 1900). The query 306 may include such an ordered sequence of labels as part of the pipeline skeleton 2002. For example, FIG. 19 illustrates an example of mapping an unordered set of labels generated by the pipeline skeleton ML model into an ordered sequence of labels using the sequence graph 1900. The unordered set of labels may be first mapped onto corresponding nodes in the sequence graph 1900, illustrated by the bold-faced set of nodes "Read Data", "Fill Missing Values", "Convert String to Int", "Split Train Test", and "Random Forest". Then a sub-graph of the sequence graph 1900 represented by these nodes may be extracted, and a node topological order may be computed on this sub-graph to provide the ordered sequence of these labels, represented in the pipeline skeleton 2002.

In some embodiments, the query 306 may be employed to search through the existing ML projects stored in the ML project corpus 104. This searching may include, for each existing ML project stored in the ML project corpus 104, generating a labels vector and generating a weight from a quality measure of the existing ML project. Then, this searching may include a Weighted Set Cover (WSC) problem from the existing ML projects stored in the ML project corpus 104 based on their weights and labels vectors, and solving the WSC problem to select the set of existing ML projects that together include all of the labels in the ordered set of labels. For example, given a set of cleaned candidate computational notebooks: $J=\{J_1, J_2, \ldots J_m\}$ which collectively contain semantic labels drawn from a universe: $U=\{s_1, s_2, \ldots, s_n\}$, and a set of required semantic labels: $R=\{s_i, s_j, \ldots s_k\}$, the search may be formulated to select a subset $S \subseteq J$ which together contain all the semantic labels in R, i.e., $\cup_{j \in S} s_j = R$. In some embodiments, this may result in a selection that includes a minimal number of computational notebooks.

After the searching is complete, the search results, such as the relevant existing ML projects 110, may be merged (e.g., at the pipeline merge 308) to generate the new ML pipeline 112 for the new ML project 310. This pipeline merge 308 may include taking all functional blocks for the new ML project (e.g., corresponding to the ordered set of labels) from the ML pipelines 111 set of relevant existing ML projects 110. For example, as disclosed in FIG. 20, if the relevant existing ML projects 110 are represented by the three ML projects labeled "Mushroom Classification", "World Happiness Report 2019", and "Cardio" in the table 2050, each of the function blocks in the pipeline skeleton 2002 may be taken from the functional blocks of these three ML projects. Since the ML project labeled "Mushroom Classification" has the majority of the functional blocks needed, it may be treated as the main ML project, while the remaining functional blocks may be taken from the ML project "World Happiness Report 2019", which may be treated as a supporting ML project. In some embodiments, if the same label is present in multiple supporting computational notebooks, one of the computational notebooks may be selected (e.g., based on quality, randomly, etc.). For example, FIG. 20 illustrates the case where the ML project corpus 104 contains a total of three ML projects and the search (e.g., as solved through WSC problem disclosed herein) retrieves the first two ML projects as sufficient to fit the pipeline skeleton 2002.

The pipeline merge 308 may further include adapting the functional blocks of the new ML pipeline for the new ML project. This adapting may include resolving any discrepancies in variable names or object names (e.g., adapting names based on program analysis) to enable the new ML pipeline 112 to be executed to perform the new ML task 108 on the new dataset 106.

Modifications, additions, or omissions may be made to the sequence graph 1900, the pipeline skeleton 2002, and the table 2050 without departing from the scope of the present disclosure. For example, each of the sequence graph 1900, the pipeline skeleton 2002, and the table 2050 may include fewer components or more components than illustrated in FIGS. 19 and 20.

As indicated above, the embodiments described in the present disclosure may include the use of a special purpose or general purpose computer including various computer hardware or software modules, as discussed in greater detail below. Further, as indicated above, embodiments described in the present disclosure may be implemented using computer-readable media for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. This interpretation of the phrase "A or B" is still applicable even though the term "A and/or B" may be used at times to include the possibilities of "A" or "B" or "A and B."

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   normalizing machine learning (ML) pipelines of existing ML projects stored in a corpus of existing ML projects;
   extracting functional blocks from the normalized ML pipelines, the extracting of the functional blocks including:
     splitting each ML pipeline of each of the existing ML projects stored in the corpus into code cells, each code cell delineated by commented text generating a directed graph;
     for each statement in each of the code cells:
       adding the statement as a node in the directed graph or incrementing a count in an existing node in the directed graph for that statement,
       computing a co-occurrence score between the statement and a statement just prior to the statement in the code cell, and
       creating an edge between the node for a statement and a node for a statement just prior to the statement if the co-occurrence score is greater than a co-occurrence score threshold;
     marking all statements corresponding to nodes connected by edges as idiomatic functional blocks; and
     marking each set of nodes corresponding to contiguous statements in any of the normalized ML pipelines, not marked as one of the idiomatic functional blocks, as custom functional blocks;
   generating a label for each of the functional blocks in the normalized ML pipelines based on the statements respectively corresponding to the functional blocks and based on whether the respective functional blocks are marked as idiomatic functional blocks or custom functional blocks:
   indexing each of the ML pipelines in the corpus based on the labels corresponding to the functional blocks;
   identifying, from the functional blocks included in the corpus, a set of functional blocks for use with respect to a new ML project, the set of functional blocks being identified as having functionality corresponding to performance of a new ML task of the new ML project, the set of functional blocks being identified based on respective labels corresponding to individual functional blocks of the set of functional blocks; and
   generating a new pipeline to perform the new ML task, the generating of the new pipeline including:
     populating the new pipeline with the set of functional blocks; and
     adapting code of one or more individual functional blocks of the set of functional blocks such that the respective functional blocks of the set of functional blocks are syntactically consistent with each other.

2. The method of claim 1, wherein the normalizing of the ML pipelines of the existing ML projects stored in the corpus comprises:
- normalizing variable names in the ML pipelines of the existing ML projects;
- replacing column names with column data types in the ML pipelines of the existing ML projects;
- removing parameters from application program interfaces (API) statements in the ML pipelines of the existing ML projects; and
- collapsing repeated instance of an API statement into a single instance of the API statement in the ML pipelines of the existing ML projects.

3. The method of claim 1, wherein the generating of the label for each of the functional blocks in the normalized ML pipelines comprises, for each functional block in the functional blocks:
- extracting text from any comment(s) in the functional block or, in the absence of any comment(s) in the functional block, mining text from documents of any API statement(s) in the functional block;
- identifying first common verb(s) and noun(s) or noun-phrase(s) in the extracted or mined text; and
- generating the label for the functional block based on the first common verb(s) and noun(s) or noun-phrase(s).

4. The method of claim 3, wherein the generating of the label for each of the functional blocks in the normalized ML pipelines further comprises:
- generating a similarity score for each pair of the functional blocks in the normalized ML pipelines;
- generating groups of the functional blocks where their similarity scores are greater than a similarity score threshold; and
- updating the labels assigned to each of the functional blocks in each group of the functional blocks to a common label.

5. The method of claim 4, wherein the updating of the labels assigned to each of the functional blocks in each group of the functional blocks to a common label comprises:
- identifying second common verb(s) and noun(s) or noun-phrase(s) in the labels of each of the functional blocks in the group of the functional blocks; and
- generating the common label for the group of the functional blocks based on the second common verb(s) and noun(s) or noun-phrase(s).

6. One or more non-transitory computer-readable storage media configured to store instructions that, in response to being executed, cause a system to perform operations, the operations comprising:
- normalizing machine learning (ML) pipelines of existing ML projects stored in a corpus of existing ML projects;
- extracting functional blocks from the normalized ML pipelines, the extracting of the functional blocks including:
  - splitting each ML pipeline of each of the existing ML projects stored in the corpus into code cells, each code cell delineated by commented text;
  - generating a directed graph;
  - for each statement in each of the code cells:
    - adding the statement as a node in the directed graph or incrementing a count in an existing node in the directed graph for that statement,
    - computing a co-occurrence score between the statement and a statement just prior to the statement in the code cell, and
    - creating an edge between the node for a statement and a node for a statement just prior to the statement if the co-occurrence score is greater than a co-occurrence score threshold;
  - marking all statements corresponding to nodes connected by edges as idiomatic functional blocks; and
  - marking each set of nodes corresponding to contiguous statements in any of the normalized ML pipelines, not marked as one of the idiomatic functional blocks, as custom functional blocks;
- generating a label for each of the functional blocks in the normalized ML pipelines based on the statements respectively corresponding to the functional blocks and based on whether the respective functional blocks are marked as idiomatic functional blocks or custom functional blocks:
- indexing each of the ML pipelines in the corpus based on the labels assigned to the functional blocks;
- identifying, from the functional blocks included in the corpus, a set of functional blocks for use with respect to a new ML project, the set of functional blocks being identified as having functionality corresponding to performance of a new ML task of the new ML project, the set of functional blocks being identified based on respective labels corresponding to individual functional blocks of the set of functional blocks; and
- generating a new pipeline to perform the new ML task, the generating of the new pipeline including:
  - populating the new pipeline with the set of functional blocks; and
  - adapting code of one or more individual functional blocks of the set of functional blocks such that the respective functional blocks of the set of functional blocks are syntactically consistent with each other.

7. The one or more non-transitory computer-readable storage media of claim 6, wherein the normalizing of the ML pipelines of the existing ML projects stored in the corpus comprises:
- normalizing variable names in the ML pipelines of the existing ML projects;
- replacing column names with column data types in the ML pipelines of the existing ML projects;
- removing parameters from application program interfaces (API) statements in the ML pipelines of the existing ML projects; and
- collapsing repeated instance of an API statement into a single instance of the API statement in the ML pipelines of the existing ML projects.

8. The one or more non-transitory computer-readable storage media of claim 6, wherein the generating of the label for each of the functional blocks in the normalized ML pipelines comprises, for each functional block in the functional blocks:
- extracting text from any comment(s) in the functional block or, in the absence of any comment(s) in the functional block, mining text from documents of any API statement(s) in the functional block;
- identifying first common verb(s) and noun(s) or noun-phrase(s) in the extracted or mined text; and
- generating the label for the functional block based on the first common verb(s) and noun(s) or noun-phrase(s).

9. The one or more non-transitory computer-readable storage media of claim 8, wherein the generating of the label for each of the functional blocks in the normalized ML pipelines further comprises:
- generating a similarity score for each pair of the functional blocks in the normalized ML pipelines;

generating groups of the functional blocks where their similarity scores are greater than a similarity score threshold; and updating the labels assigned to each of the functional blocks in each group of the functional blocks to a common label.

10. The one or more non-transitory computer-readable storage media of claim 9, wherein the updating of the labels assigned to each of the functional blocks in each group of the functional blocks to a common label comprises:

identifying second common verb(s) and noun(s) or noun-phrase(s) in the labels of each of the functional blocks in the group of the functional blocks; and generating the common label for the group of the functional blocks based on the second common verb(s) and noun(s) or noun-phrase(s).

11. A system comprising:

one or more processors; and one or more non-transitory computer-readable storage media configured to store instructions that, in response to being executed by the one or more processors, cause the system to perform operations, the operations comprising:

normalizing machine learning (ML) pipelines of existing ML projects stored in a corpus of existing ML projects;

extracting functional blocks from the normalized ML pipelines, the extracting of the functional blocks including:

splitting each ML pipeline of each of the existing ML projects stored in the corpus into code cells, each code cell delineated by commented text;

generating a directed graph;

for each statement in each of the code cells:

adding the statement as a node in the directed graph or incrementing a count in an existing node in the directed graph for that statement, computing a co-occurrence score between the statement and a statement just prior to the statement in the code cell, and creating an edge between the node for a statement and a node for a statement just prior to the statement if the co-occurrence score is greater than a co-occurrence score threshold;

marking all statements corresponding to nodes connected by edges as idiomatic functional blocks; and marking each set of nodes corresponding to contiguous statements in any of the normalized ML pipelines, not marked as one of the idiomatic functional blocks, as custom functional blocks;

generating a label for each of the functional blocks in the normalized ML pipelines based on the statements respectively corresponding to the functional blocks and based on whether the respective functional blocks are marked as idiomatic functional blocks or custom functional blocks;

assigning a label to each of the functional blocks in the normalized ML pipelines;

indexing each of the ML pipelines in the corpus based on the labels assigned to the functional blocks;

identifying, from the functional blocks included in the corpus, a set of functional blocks for use with respect to a new ML project, the set of functional blocks being identified as having functionality corresponding to performance of a new ML task of the new ML project, the set of functional blocks being identified based on respective labels corresponding to individual functional blocks of the set of functional blocks; and generating a new pipeline to perform the new ML task, the generating of the new pipeline including:

populating the new pipeline with the set of functional blocks; and adapting code of one or more individual functional blocks of the set of functional blocks such that the respective functional blocks of the set of functional blocks are syntactically consistent with each other.

12. The system of claim 11, wherein the normalizing of the ML pipelines of the existing ML projects stored in the corpus comprises:

normalizing variable names in the ML pipelines of the existing ML projects;

replacing column names with column data types in the ML pipelines of the existing ML projects;

removing parameters from application program interfaces (API) statements in the ML pipelines of the existing ML projects; and collapsing repeated instance of an API statement into a single instance of the API statement in the ML pipelines of the existing ML projects.

13. The system of claim 11, wherein the generating of the label for each of the functional blocks in the normalized ML pipelines comprises, for each functional block in the functional blocks:

extracting text from any comment(s) in the functional block or, in the absence of any comment(s) in the functional block, mining text from documents of any API statement(s) in the functional block;

identifying first common verb(s) and noun(s) or noun-phrase(s) in the extracted or mined text; and generating the label for the functional block based on the first common verb(s) and noun(s) or noun-phrase(s).

14. The system of claim 13, wherein:

the generating of the label for each of the functional blocks in the normalized ML pipelines further comprises:

generating a similarity score for each pair of the functional blocks in the normalized ML pipelines, generating groups of the functional blocks where their similarity scores are greater than a similarity score threshold, and updating the labels assigned to each of the functional blocks in each group of the functional blocks to a common label; and the updating of the labels assigned to each of the functional blocks in each group of the functional blocks to a common label comprises:

identifying second common verb(s) and noun(s) or noun-phrase(s) in the labels of each of the functional blocks in the group of the functional blocks, and generating the common label for the group of the functional blocks based on the second common verb(s) and noun(s) or noun-phrase(s).

\* \* \* \* \*